(12) United States Patent
Feuillette et al.

(10) Patent No.: US 11,913,971 B2
(45) Date of Patent: Feb. 27, 2024

(54) MOTION-SENSITIVE FIELD EFFECT TRANSISTOR, MOTION DETECTION SYSTEM, AND METHOD

(71) Applicant: GLOBALFOUNDRIES U.S. Inc., Malta, NY (US)

(72) Inventors: Romain H. A. Feuillette, San Jose, CA (US); David C. Pritchard, Glenville, NY (US); Elizabeth Strehlow, Malta, NY (US); James P. Mazza, Saratoga Springs, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 510 days.

(21) Appl. No.: 17/183,432

(22) Filed: Feb. 24, 2021

(65) Prior Publication Data

US 2022/0268805 A1  Aug. 25, 2022

(51) Int. Cl.
*G01P 15/00* (2006.01)
*G01C 9/24* (2006.01)
(Continued)

(52) U.S. Cl.
CPC .............. *G01P 15/006* (2013.01); *G01C 9/06* (2013.01); *G01C 9/20* (2013.01); *G01C 9/24* (2013.01);
(Continued)

(58) Field of Classification Search
CPC ... G01C 9/06; G01C 9/20; G01C 9/24; G01C 2009/182; G01P 15/006; G01P 15/124
(Continued)

(56) References Cited

U.S. PATENT DOCUMENTS

| 4,322,680 A | 3/1982 | Janata et al. |
| 5,098,856 A * | 3/1992 | Beyer .................. H01L 21/764 257/E21.573 |

(Continued)

FOREIGN PATENT DOCUMENTS

| CN | 103712600 A * | 4/2014 | ............... G01C 9/20 |
| CN | 109029358 A * | 12/2018 | ............... G01C 9/18 |

(Continued)

OTHER PUBLICATIONS

Machine translation, Zhang, Chinese Pat. Pub. No. CN-109029358-A, translation date: Sep. 7, 2023, Clarivate Analytics, all pages. (Year: 2023).*

(Continued)

*Primary Examiner* — Victoria K. Hall
(74) *Attorney, Agent, or Firm* — Anthony Canale; Hoffman Warnick LLC

(57) ABSTRACT

Disclosed are a motion-sensitive field effect transistor (MSFET), a motion detection system, and a method. The MSFET includes a gate structure with a reservoir containing conductive fluid and gate electrode(s). Given position(s) of the gate electrode(s) and a fill level of the fluid within the reservoir, contact between the gate electrode(s) and the fluid depends upon the orientation the MSFET channel region relative to the top surface of the conductive fluid and the orientation of the MSFET channel region relative to the top surface of the conductive fluid depends upon position in space and/or movement of the MSFET and, particularly, position in space and/or movement of the chip on which the MSFET is formed. An electrical property of the MSFET in response to specific bias conditions varies depending on whether or not or to what extent the gate electrode(s) contact the fluid and is, thus, measurable for sensing chip motion.

20 Claims, 28 Drawing Sheets

(51) Int. Cl.
*G01C 9/06* (2006.01)
*G01C 9/20* (2006.01)
*G01P 15/18* (2013.01)
*G01C 9/18* (2006.01)

(52) U.S. Cl.
CPC ........ *G01P 15/18* (2013.01); *G01C 2009/182* (2013.01)

(58) Field of Classification Search
USPC ....................................................... 257/253
See application file for complete search history.

(56) References Cited

U.S. PATENT DOCUMENTS

| | | | |
|---|---|---|---|
| 8,110,410 B2 | 2/2012 | Peng et al. | |
| 10,088,311 B2* | 10/2018 | Eskew | G01C 9/18 |
| 10,172,598 B2 | 1/2019 | Amoako-Tuffour et al. | |
| 10,495,603 B1 | 12/2019 | Tan et al. | |
| 10,746,691 B1* | 8/2020 | Cheng | G01N 27/414 |
| 2002/0125059 A1* | 9/2002 | Zeller | G01C 9/20 180/282 |
| 2006/0129332 A1* | 6/2006 | Mimura | G01N 27/4148 702/23 |
| 2012/0330126 A1 | 12/2012 | Hoppe et al. | |
| 2014/0139204 A1 | 5/2014 | Bashir et al. | |
| 2018/0073874 A1* | 3/2018 | Eskew | G01C 9/06 |
| 2020/0173958 A1 | 6/2020 | Chiang et al. | |

FOREIGN PATENT DOCUMENTS

| | | | | |
|---|---|---|---|---|
| DE | 10-2004-048747 A1 * | 4/2006 | ............... | G01C 9/06 |
| WO | WO-9210721 A1 * | 6/1992 | ............... | G01C 9/06 |

OTHER PUBLICATIONS

Machine translation, Krone, German Pat. Pub. No. DE-10-2004-048747-A1, translation date: Sep. 6, 2023, Espacenet, all pages. (Year: 2023).*
Machine translation, Chen, Chinese Pat. Pub. No. CN-103712600-A, translation date: Sep. 6, 2023, Espacenet, all pages. (Year: 2023).*
Moser et al., "ISFETs in CMOS and Emergent Trends in Instrumentation: A Review", IEEE Sensors Journal, vol. 16, No. 17, 2016, pp. 6496-6514.
Wroblewski, Wojciech, "Field Effect Transistors (FETs) as Transducers in Electrochemical Sensors", Chemical Sensors Research Group, 1996, pp. 1-7.
Kang et al., "Micro-Accelerometer Based on Vertically Movable Gate Field Effect Transistor", Nano-Micro Letters, 2015, pp. 1-9.
Shalev et al., "Standard CMOS Fabrication of a Sensitive Fully Depleted Electrolyte-Insulator-Semiconductor Field Effect Transistor for Biosensor Applications", Sensors, 9, 2009, pp. 4366-4379.
Parizi et al., "ISFET pH Sensitivity: Counter-Ions Play a Key Role", Scientific Reports, 2017, pp. 1-10.
XeF2 Vapor Release Etch SPTS, http://www.spts.com/categories/xef2-release-etch, pp. 1-3, Accessed on Feb. 17, 2021.

* cited by examiner

| f | V1 | V2 | VT check | Vdiff |
|---|---|---|---|---|
| 0.1 | 0.14 | 1.38 | 1.5 | 1.23 |
| 0.2 | 0.25 | 1.25 | 1.5 | 1.00 |
| 0.3 | 0.35 | 1.15 | 1.5 | 0.81 |
| 0.4 | 0.43 | 1.07 | 1.5 | 0.64 |
| 0.5 | 0.50 | 1.00 | 1.5 | 0.50 |
| 0.6 | 0.56 | 0.94 | 1.5 | 0.38 |
| 0.7 | 0.62 | 0.88 | 1.5 | 0.26 |
| 0.8 | 0.67 | 0.83 | 1.5 | 0.17 |
| 0.9 | 0.71 | 0.79 | 1.5 | 0.08 |
| 1 | 0.75 | 0.75 | 1.5 | 0.00 |

FIG. 11

| | VT prime | | | | | | | | | |
|---|---|---|---|---|---|---|---|---|---|---|
| nEl | f=0.1 | f=0.2 | f=0.3 | f=0.4 | f=0.5 | f=0.6 | f=0.7 | f=0.8 | f=0.9 | f=1 |
| 10 | 0.14 | 0.25 | 0.35 | 0.43 | 0.50 | 0.56 | 0.62 | 0.67 | 0.71 | 0.75 |
| 9 | 0.26 | 0.35 | 0.43 | 0.49 | 0.55 | 0.60 | 0.64 | 0.68 | 0.72 | 0.75 |
| 8 | 0.38 | 0.45 | 0.51 | 0.56 | 0.60 | 0.64 | 0.67 | 0.70 | 0.73 | 0.75 |
| 7 | 0.50 | 0.55 | 0.59 | 0.62 | 0.65 | 0.68 | 0.70 | 0.72 | 0.73 | 0.75 |
| 6 | 0.63 | 0.65 | 0.67 | 0.69 | 0.70 | 0.71 | 0.72 | 0.73 | 0.74 | 0.75 |
| 5 | 0.75 | 0.75 | 0.75 | 0.75 | 0.75 | 0.75 | 0.75 | 0.75 | 0.75 | 0.75 |
| 4 | 0.87 | 0.85 | 0.83 | 0.81 | 0.80 | 0.79 | 0.78 | 0.77 | 0.76 | 0.75 |
| 3 | 1.00 | 0.95 | 0.91 | 0.88 | 0.85 | 0.83 | 0.80 | 0.78 | 0.77 | 0.75 |
| 2 | 1.12 | 1.05 | 0.99 | 0.94 | 0.90 | 0.86 | 0.83 | 0.80 | 0.77 | 0.75 |
| 1 | 1.24 | 1.15 | 1.07 | 1.01 | 0.95 | 0.90 | 0.86 | 0.82 | 0.78 | 0.75 |

FIG. 12

MOTION-SENSITIVE FIELD EFFECT TRANSISTOR, MOTION DETECTION SYSTEM, AND METHOD

BACKGROUND

Field of the Invention

The present invention relates to on-chip motion sensors and, more particularly, to embodiments of a motion-sensitive field effect transistor (MSFET), a motion detection system, and associated methods.

Description of Related Art

Many applications that run on computerized devices (e.g., on smart phones, digital cameras, security systems, virtual reality (VR) systems, gaming systems, etc.) are motion-aware applications. Such motion-aware applications include, but are not limited to, automatic driving/do not disturb mode applications, image stabilization applications, anti-theft or other security applications, motion-aware hearable applications, VR or gaming applications, etc. Motion-awareness is typically achieved through the use of a micro-electro-mechanical system (MEMS) accelerometer, which measures acceleration forces on an object without a fixed reference. Acceleration forces can be static (e.g., gravity) or dynamic (e.g., movement or vibrations). Acceleration forces can also be directional. The most commonly used MEMs accelerometer is an on-chip capacitive accelerometer. Unfortunately, such accelerometers consume a significant amount (if not all) of the surface area of the IC chip.

SUMMARY

Disclosed herein are embodiments of a motion sensing field effect transistor (MSFET) that exhibits at least one motion-dependent electrical property such that the MSFET can be employed as a motion sensor. More specifically, the disclosed MSFET can include a channel region positioned laterally between source/drain regions. The MSFET can further include a gate structure. The gate structure can include a reservoir with a bottom adjacent to the channel region. Conductive fluid can be contained within the reservoir and, particularly, can only partially fill the reservoir. It should be noted that the reservoir can be capped to prevent leakage of the fluid so that the amount of fluid contained within the reservoir is fixed. The gate structure can further include at least one gate electrode, which is located at a fixed location within the reservoir. Given the fixed location of each gate electrode within the reservoir and the fill level of the conductive fluid within the reservoir, contact between the gate electrode(s) and the conductive fluid depends upon the orientation the channel region relative to the top surface of the conductive fluid and the orientation of the channel region relative to the top surface of the conductive fluid depends upon position in space and/or movement of the MSFET and, more particularly, position in space and/or movement (e.g., tilt and/or acceleration) of the chip on which the MSFET is formed.

With such a MSFET structure, an electrical property will vary as a function of the total effective gate voltage applied to the conductive fluid through the gate electrode(s) (or sub-electrodes thereof) and the total effective gate voltage applied to the conductive fluid will vary as a function of which ones of gate electrode(s) (or, if applicable, which ones of the sub-electrodes thereof) is/are in contact with the conductive fluid. Since contact between the conductive fluid and the gate electrode(s) (or sub-electrodes thereof) is motion-dependent, chip motion (e.g., chip tilt and/or acceleration) can be characterized based on the measured value of the electric property in response to specific bias conditions. Therefore, also disclosed herein are embodiments of a motion detection system (MDS) that incorporates the above-described MSFET and a motion detection method.

Specifically, disclosed embodiments of a MDS can include a chip. The chip can include a MSFET, as described above. That is, the MSFET can include a channel region positioned laterally between source/drain regions. The MSFET can further include a gate structure. The gate structure can include a reservoir with a bottom adjacent to the channel region. Conductive fluid can be contained within the reservoir and, particularly, can only partially fill the reservoir. The gate structure can further include at least one gate electrode, which is located at a fixed location within the reservoir. The chip can further include a bias circuit, which is electrically connected to the MSFET and which is configured to apply specific bias conditions to the MSFET. The chip can further include a sense circuit, which is electrically connected to the MSFET and which is configured to sense (e.g., detect and measure) an electrical property of the MSFET in response to the specific bias conditions. The system can further include a controller (e.g., a processor), which is either on or off chip, which is in communication with the bias circuit and the sense circuit, and which can characterize chip motion (e.g., chip tilt and/or acceleration) based on the measured value of the electrical property in response to the specific bias conditions.

Disclosed embodiments of a motion detection method can include providing a chip with a MSFET, as described above. That is, the MSFET can include a channel region positioned laterally between source/drain regions. The MSFET can further include a gate structure. The gate structure can include a reservoir with a bottom adjacent to the channel region. Conductive fluid can be contained within the reservoir and, particularly, can only partially fill the reservoir. The gate structure can further include at least one gate electrode, which is located at a fixed location within the reservoir. The method can further include applying specific bias conditions to the MSFET. The specific bias conditions can be applied, for example, by an on-chip bias circuit electrically connected to the MSFET. The method can further include sensing (e.g., detecting and measuring) an electrical property of the MSFET in response to the specific bias conditions. The electrical property can be sensed, for example, by an on-chip sense circuit electrically connected to the MSFET. The method can further include characterizing chip motion (e.g., chip tilt and/or acceleration) based on the measured value of the electrical property in response to the specific bias conditions. Chip motion can be characterized, for example, by a controller (e.g., a processor), which is either on chip or off chip and which is in communication with the bias circuit and the sense circuit.

As discussed further in the detailed description section below, the sensitivity of the disclosed MDS and method can be improved by increasing the number of gate electrodes and/or by incorporating stacked electrically isolated sub-electrodes within each gate electrode.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 4A to 4C-2 are cross-section diagrams illustrating another alternative embodiment of a MSFET that can be incorporated into the MDS of FIG. 1;

FIGS. 5A to 5C-2 are cross-section diagrams illustrating yet another alternative embodiment of a MSFET that can be incorporated into the MDS of FIG. 1;

FIGS. 11-12 are tables illustrating exemplary gate electrode bias conditions and movement-dependent changes in total effective gate voltage;

DETAILED DESCRIPTION

Figure 1:
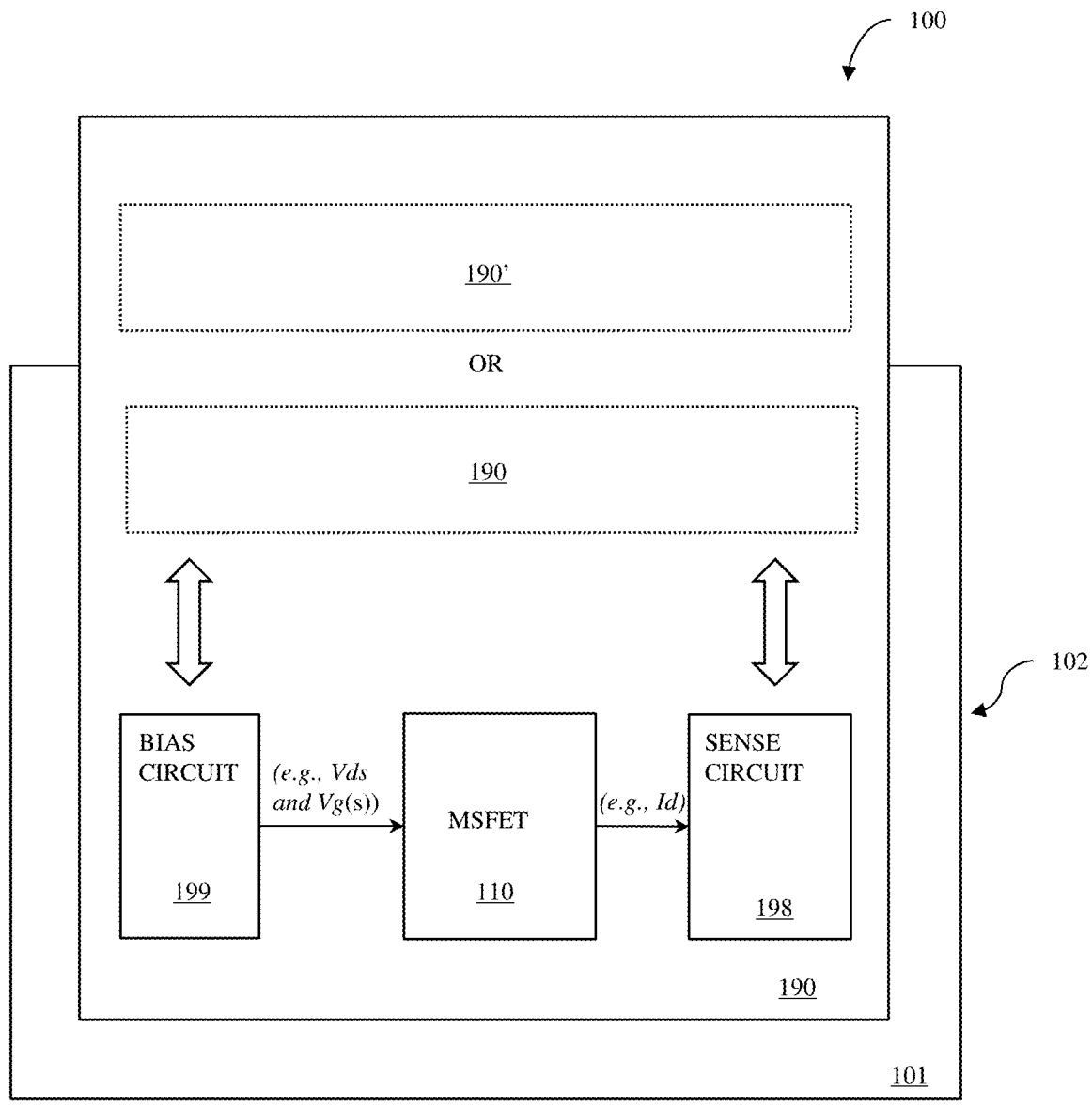
FIG. 1 is a schematic diagram illustrating embodiments of a motion detection system (MDS) including a motion sensing field effect transistor (MSFET) that exhibits at least one motion-dependent electrical property.

As mentioned above, many applications that run on electronic devices or systems (e.g., on smart phones, digital cameras, security systems, virtual reality (VR) systems, gaming systems, etc.) are motion-aware applications. Such motion-aware applications include, but are not limited to, automatic driving/do not disturb mode applications, image stabilization applications, anti-theft or other security applications, motion-aware hearable applications, VR or gaming applications, etc. Motion-awareness is typically achieved through the use of a micro-electro-mechanical system (MEMS) accelerometer, which measures acceleration forces on an object without a fixed reference. Acceleration forces can be static (e.g., gravity) or dynamic (e.g., movement or vibrations). Acceleration forces can also be directional. The most commonly used MEMs accelerometer is a capacitive accelerometer, which includes a combination of both fixed capacitor plates and flexible capacitor plates on an integrated circuit (IC) chip. When an object (e.g., an electronic device) that incorporates the IC chip and, thereby the MEMS accelerometer undergoes acceleration, the distance between the fixed and flexible capacitor plates changes and, thus, so does the electrical capacitance. However, to accurately detect linear motion, the on-chip MEMS accelerometer must be relatively large (e.g., >50 microns (μm)) such that it consumes a significant amount (if not all) of the surface area of the IC chip.

In view of the foregoing, disclosed herein are embodiments of a motion sensing field effect transistor (MSFET), which is configured to exhibit at least one motion-dependent electrical property such that it can be employed as a motion sensor. Specifically, in the MSFET, a gate structure, which is adjacent to a channel region, can include: a reservoir that contains conductive fluid and one or more gate electrodes located at fixed location(s) within the reservoir. Given the fixed location of each gate electrode within the reservoir and the fill level of the conductive fluid within the reservoir, contact between the gate electrode(s) and the conductive fluid depends upon the orientation the channel region relative to the top surface of the conductive fluid and the orientation of the channel region relative to the top surface of the conductive fluid depends upon position in space and/or movement of the MSFET and, more particularly, upon position in space and/or movement (e.g., tilt and/or acceleration) of the chip on which the MSFET is formed. With such a MSFET structure, an electrical property in response to specific bias conditions will vary as a function of whether or not the gate electrode(s) (or, if applicable, sub-electrodes thereof) is/are in contact with the conductive fluid. Thus, the electrical property can be measured in order to characterize chip motion (e.g., chip tilt and/or acceleration). Also disclosed herein are embodiments of a motion detection system (MDS) that incorporates such a MSFET and embodiments of a motion detection method that employs such a MSFET.

Figure 2A:
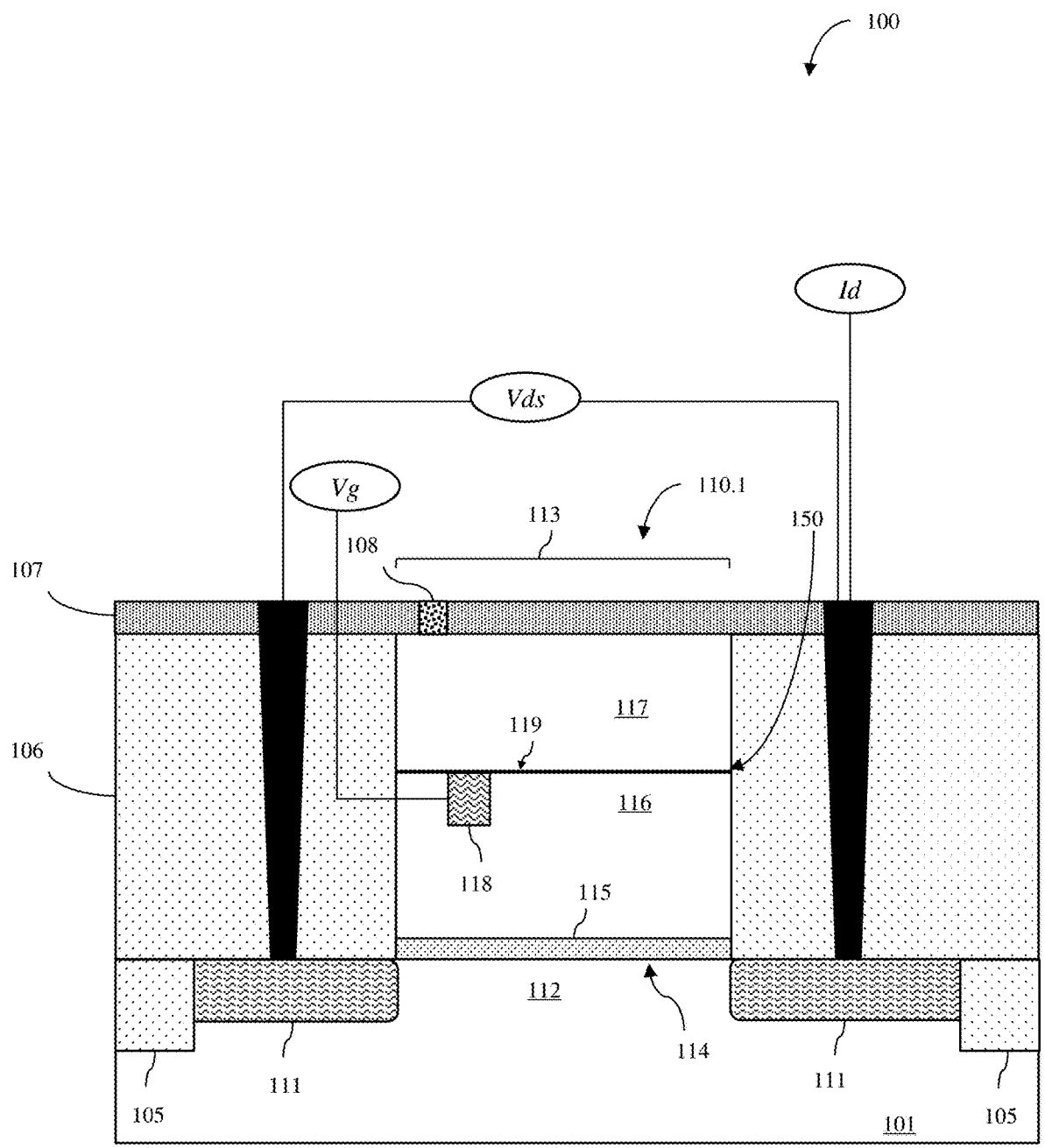
FIGS. 2A to 2C are cross-section diagrams illustrating an embodiment of a MSFET that can be incorporated into the MDS of FIG. 1.
Figure 2B:
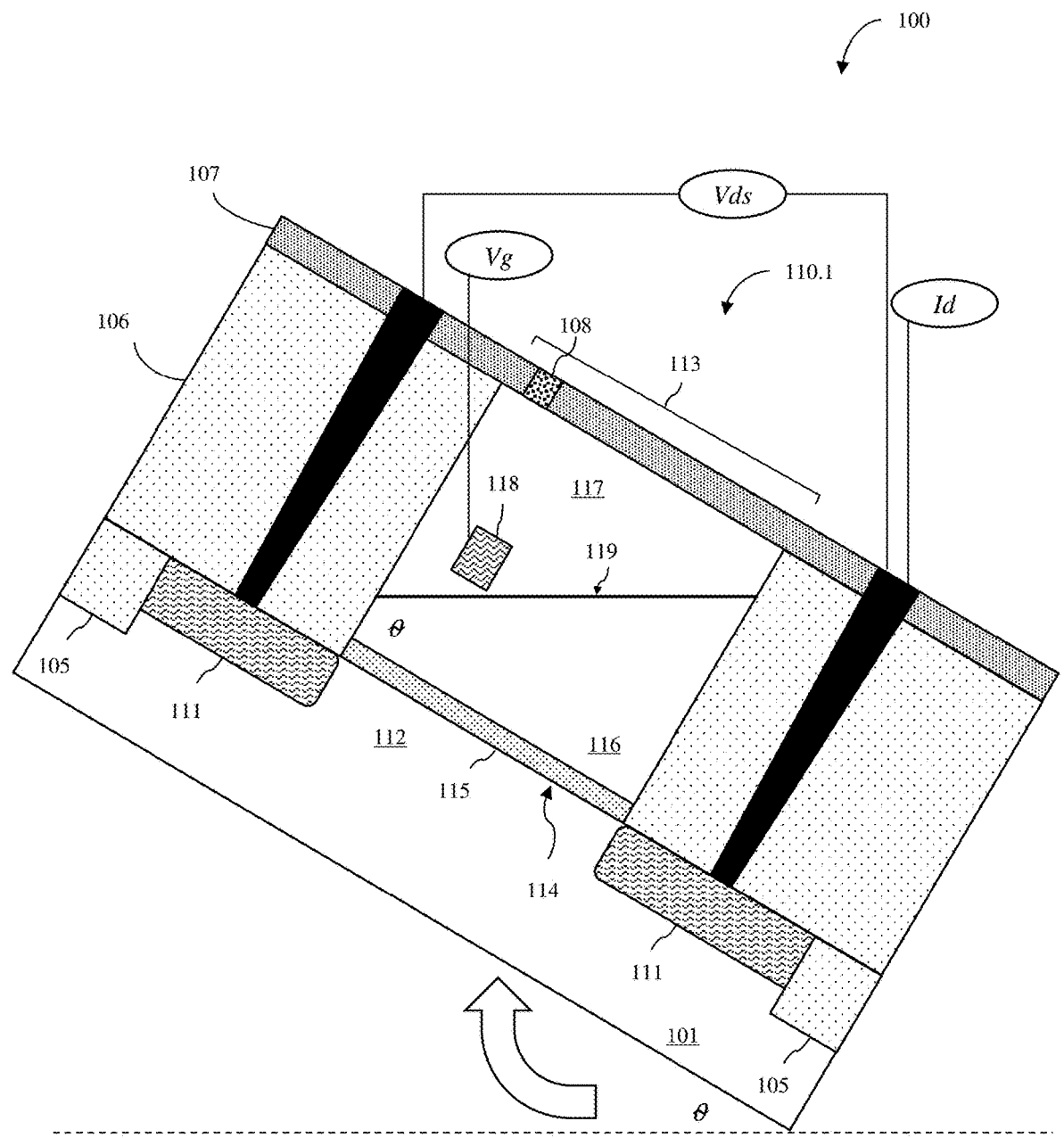
Figure 2C:
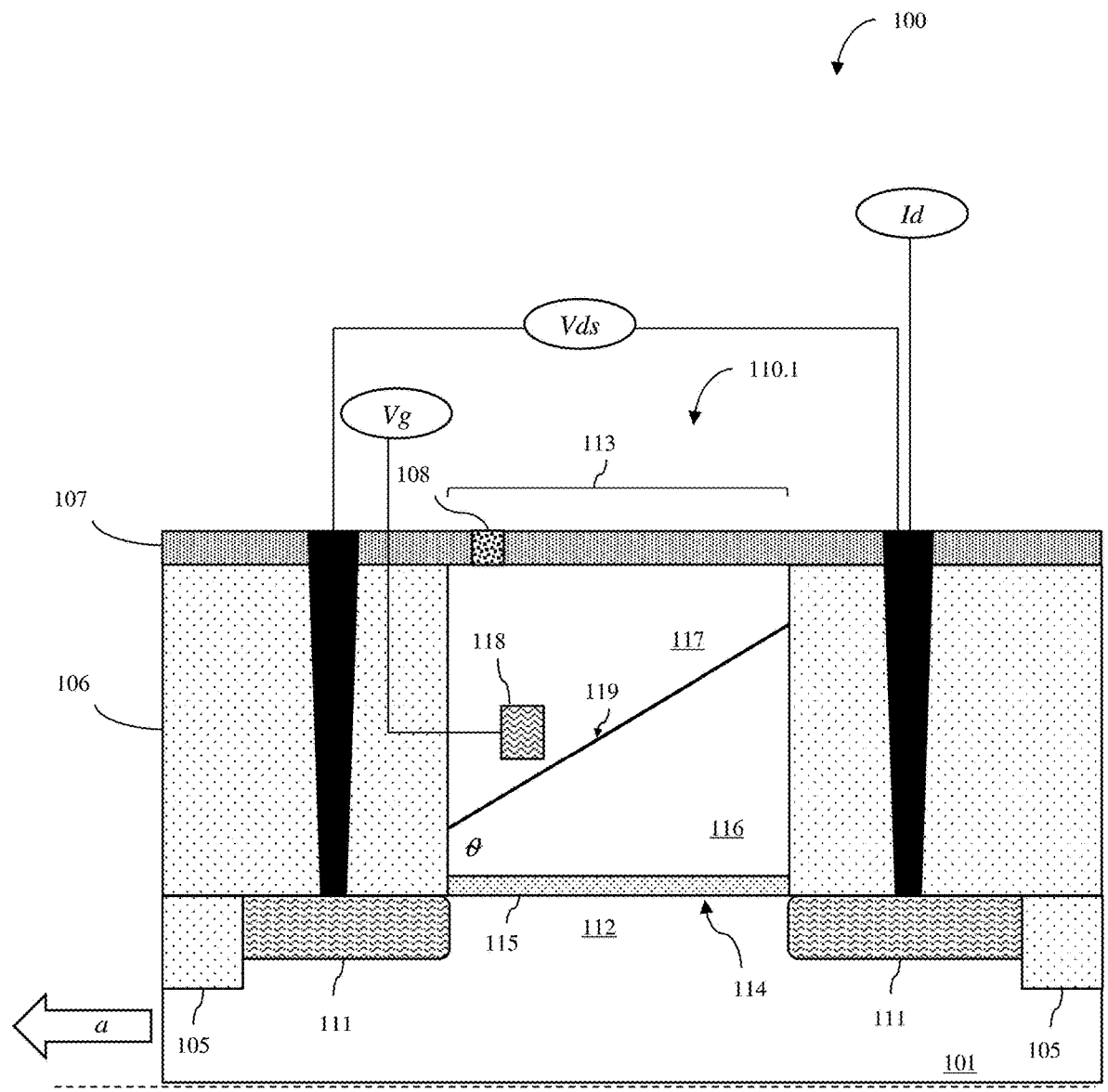

Referring to FIG. 1 disclosed herein are embodiments of a motion detection system (MDS) 100 and also embodiments of a motion sensing field effect transistor (MSFET) 110, which exhibits at least one motion-dependent electrical property and which is incorporated into the MDS 100 (e.g., as a motion sensor). Exemplary MSFET structures 110 that can be incorporated into the MDS 100 include, but are not limited to, the MSFET 110.1 as shown in FIGS. 2A to 2C, the MSFET 110.2 as shown FIGS. 3A to 3C-2, the MSFET 110.3 as shown FIGS. 4A to 4C-2, and the MSFET 110.4 as shown in FIGS. 5A to 5C-2.

More specifically, the MDS 100 can include an integrated circuit (IC) chip 102. The MDS 100 can be fully contained on the chip 102 (i.e., can be a system-on-chip (SOC)). Alternatively, the MDS 100 can include components that are both on and off chip.

In any case, the chip 102 can include a semiconductor substrate 101. The semiconductor substrate 101 can be, for example, a bulk semiconductor substrate (e.g., a bulk silicon substrate or some other type of bulk semiconductor substrate), as illustrated. Alternatively, the semiconductor substrate 101 can be a semiconductor-on-insulator substrate (e.g., a silicon-on-insulator (SOI) substrate). Isolation regions 105 (e.g., shallow trench isolation (STI) regions) in the substrate 101 (e.g., in the upper portion of a bulk semiconductor substrate or in the semiconductor layer of a semiconductor-on-insulator substrate) can define an active device region for a motion sensing field effect transistor (MSFET) 110 (e.g., a MSFET 110.1, as shown in FIGS. 2A to 2C; a MSFET 110.2, as shown in FIGS. 3A to 3C-2; a MISFET 110.3, as shown in FIGS. 4A to 4C-2; or a MSFET 110.4, as shown in FIGS. 5A to 5C-2).

The MSFET 110.1, 110.2, 110.3, 110.4 can be either an N-type MSFET or a P-type MSFET. Specifically, the MSFET 110.1, 110.2, 110.3, 110.4 can include, within the active device region, source/drain regions 111 and a channel region 112, which is positioned laterally between source/drain regions 111. For example, for an N-type MSFET, the source/drain regions 111 can be N+ source/drain regions, which are doped with an N-type dopant so as to have a relatively high conductivity level, and the channel region 112 can be a P− channel region, which is doped with a P-type dopant so as to have a relatively low conductivity level. For a P-type MSFET, the source/drain regions 111 can be P+ source/drain regions, which are doped with a P-type dopant so as to have a relatively high conductivity level, and the channel region 112 can be an N− channel region, which is doped with an N-type dopant so as to have a relatively low conductivity level. One or more layers of dielectric material 106 can cover the MSFET 110.1, 110.2, 110.3, 110.4 and, particularly, the source/drain regions 111. The dielectric material 106 can include interlayer dielectric (ILD) material. The ILD material 106 can include, for example, silicon dioxide, doped silicon glass (e.g., phosphosilicate glass (PSG) or borophosphosilicate glass (BPSG)), or any other suitable ILD material.

The MSFET 110.1, 110.2, 110.3, 110.4 can further include a gate structure 113 and, particularly, a conductive fluid-containing gate structure where the gate metal or doped polysilicon is replaced by a conductive fluid (e.g., an electrolyte solution). Specifically, the gate structure 113 can include a reservoir 114 (also referred to herein as a receptacle, a microwell, a trench, a cavity, etc.), which is patterned within the dielectric material 106 and which is aligned with and has a bottom adjacent to the channel region 112. For purposes of illustration, the sidewalls of the reservoir 114 are shown as being essentially vertical. However, it should be understood that the figures are not intended to be limiting and that the shape of the reservoir 114 may vary depending upon the technique used to form the reservoir 114. For example, as with the reservoir used in different known ISFET structures, the reservoir 114 of the disclosed MSFET 110.1, 110.2, 110.3, 110.4 could angled, stepped, curved, etc. The gate structure 113 can further include one or more gate dielectric layers 115 (e.g., a silicon dioxide layer or other suitable gate dielectric layer) at the bottom of the reservoir 114 immediately adjacent to the channel region 112. For purposes of illustration, a gate dielectric layer 115 is shown as being within and at the bottom of the reservoir 114 only. However, it should be understood that the figures are not intended to be limiting. For example, alternatively, a gate dielectric layer 115 could conformally line the bottom and sidewalls of the reservoir 114 or the gate dielectric layer 115 could be a layer embedded within the dielectric material 106 and the reservoir 114 could be patterned and etched eteh-such that the bottom of the reservoir 114 lands on the gate dielectric layer. The gate structure 113 can further include a conductive fluid 116 and one or more gate electrodes contained within the reservoir 114. Finally, the reservoir 114 can be capped (e.g., by a cap layer 107).

Those skilled in the art will recognize that a conventional ion-sensitive FET (ISFET) similarly has fluid-containing gate structure. In the case of an ISFET, the fluid can be an electrolyte solution, which flows into the reservoir so that it is immediately adjacent to the gate dielectric layer. A reference gate electrode can be in constant contact with the fluid. Specific bias conditions can be applied to the terminals of the ISFET and an electrical response can be measured in order to characterize and/or identify a target in/of the fluid. For example, drain current (Id) of an ISFET in response to a fixed drain-source voltage and a fixed gate voltage can be considered ion-sensitive. In this case, changes in the concentration of ions (e.g., in the concentration of hydrogen (H+) ions or other such ions) within a fluid that flows into the reservoir can result in changes in the surface potential at the interface between the gate dielectric layer and the fluid and a surface potential change can result in a threshold voltage change. Such a threshold voltage change will, in turn, result in a change in drain current (Id)). Thus, the ISFET can be employed to measure and/or characterize a target (e.g., pH or other target) in/of the fluid and is often employed as a biosensor.

The gate structure 113 of the MSFET 110.1, 110.2, 110.3, 110.4, while similar to the gate structure of an ISFET in that it is a fluid-containing gate structure, it is different from the gate structure of an ISFET because it is specifically configured to characterize movement (e.g., tilt and/or acceleration) of a chip 102 on which the MSFET is formed (as opposed to measuring or characterizing a target within the fluid).

Specifically, in the gate structure 113, the reservoir 114 is only partially filled with some fixed amount of the conductive fluid 116 (e.g., filled with the conductive fluid to some fixed level that is less than the full volume of the reservoir). The conductive fluid 116 can be an electrolyte solution. Exemplary electrolyte solutions that could be employed in the gate structure 113 include, but are not limited to, solutions of calcium chloride, potassium chloride, calcium hydroxide, and nitrogen hydroxide. Alternatively, any other suitable electrolyte solutions could be employed. However, it should be understood that care should be taken to avoid electrolyte solutions with the potential to cause corrosion of exposed materials (e.g., the ILD layer and/or the cap layer). Care should also be taken to avoid solutions with the potential to cause semiconductor device fails. For example, an electrolyte solution containing sulfuric acid should be avoided unless the ILD layer 106 and cap layer 107 are made of glass. Electrolyte solutions containing sodium salts should be avoided because sodium ions passing into the semiconductor substrate could cause semiconductor device failures. Other considerations for the electrolyte solution include stability and viscosity and, optionally, additives to optimize efficacy.

The cap layer 107 can cover the reservoir 114 so as to prevent loss or leakage of the conductive fluid 116 from the reservoir 114 so that the amount of conductive fluid 116 is consistently maintained at a fixed level. The cap layer 107 can be an insulator layer. This insulator layer could be an Organic Planarization Layer (OPL), a spin-on-glass layer, a silicon dioxide layer, a polymer layer, a Teflon layer, or some other suitable insulator layer, as discussed in greater detail below). The cap layer 107 could be a single-layered structure or, alternatively, a multi-layered structure (e.g., a laminate structure). Optionally, the cap layer 107 can include a port 108 (i.e., an opening that extends vertically through the cap layer 107 to the reservoir 114) to facilitate adding the fixed amount of the conductive fluid 116 to the reservoir 114 (e.g., injecting the conductive fluid 116 into the reservoir) following manufacture as opposed to during manufacture. The port 108 can be plugged (e.g., with an adhesive plug or a plug of some other suitable type of material) once the conductive fluid 116 is added to the reservoir, thereby preventing subsequent loss or leakage of the conductive fluid.

Given the fixed location of each gate electrode within the reservoir 114 and the fill level 150 of the conductive fluid 116 within the reservoir 114, contact between the gate electrode(s) and the conductive fluid 116 depends upon the orientation of the channel region 112 relative to the top surface 119 of the conductive fluid 116 and the orientation of the channel region 112 relative to the top surface 119 of the conductive fluid 116 depends upon position in space and/or movement of the MSFET 110.1, 110.2, 110.3, 110.4 and, more particularly, upon position in space and/or movement (e.g., tilt and/or acceleration) of the chip 102 on which the MSFET is formed.

With the disclosed MSFET structure, an electrical property will vary as a function of the total effective gate voltage applied to the conductive fluid 116 through the gate electrode(s) (or sub-electrodes thereof) and the total effective gate voltage applied to the conductive fluid 116 will vary as a function of which ones of gate electrode(s) (or, if applicable, which ones of the sub-electrodes thereof) is/are in contact with the conductive fluid. Since contact between the conductive fluid 116 and the gate electrode(s) (or sub-electrodes thereof) is motion-dependent, chip motion (e.g., chip tilt and/or acceleration) can be characterized based on the measured value of the electric property in response to specific bias conditions.

More specifically, the volume of the conductive fluid 116 contained within the reservoir 114 can be some fixed portion of the total volume of the reservoir 114 (e.g., half, two-thirds, etc.). The fixed amount of the conductive fluid 116 can be selected so that, when the chip 102 is upright (i.e., with the bottom surface of the substrate 101 being the closest to the earth's surface), level (i.e., with the bottom surface of the substrate 101 being parallel to the earth's surface) and stationary (i.e., non-moving) at least the following conditions are met: (a) the conductive fluid 116 will be immediately adjacent to and completely cover the gate dielectric layer 115 (or portion thereof) at the bottom of the reservoir 114; (b) the exposed surface 119 of the conductive fluid 116, which is not immediately adjacent to the bottom or sidewalls of the reservoir 114 and which is also referred to herein as the top surface of the conductive fluid 116, will be parallel to the bottom surface of the substrate 101 (and thereby parallel to the channel region 112 within the substrate 101) and will further be at some fixed fill level 150 between the gate dielectric layer 115 and the top of the reservoir 114; and (c) an air or gas-filled space 117 will also be contained within the reservoir 114 between the top surface 119 of the conductive fluid 116 and the cap layer 107 at the top of the reservoir 114. The fixed amount of the conductive fluid 116 can further be selected so that the orientation of the channel region 112 relative to the top surface 119 of the conductive fluid 116 varies and, particularly, goes from being parallel to being angled in response to movement of the chip 102 (i.e., in response to tilting or rotation of the chip 102 in some direction and/or in response to acceleration of the chip 102 in some direction). For example, the fixed amount of conductive fluid 116 can be selected so that space 117, which is filled with air or gas, remains within the reservoir 114 to allow the conductive fluid to move within the reservoir 114 in response to motion (e.g., tilt and/or acceleration) of the chip. The ratio of volume of conductive fluid 116 to the volume of the air or gas-filled space 117 should be such that, if a rotational force causes the chip 102 to tilt/rotate, the top surface 119 of the conductive fluid 116 will remain parallel to the earth's surface due to the force of gravity on the conductive fluid 116. Thus, the channel region 112 will be angled relative to the top surface 119 of the conductive fluid 116. Additionally or alternatively, the ratio of volume of conductive fluid 116 to the volume of the air or gas-filled space 117 should be such that, if an acceleration force causes the chip 102 to accelerate in one direction (e.g., parallel to the earth's surface), the conductive fluid 116 will slide back in the opposite direction. Thus, the channel region 112 will similarly be angled relative to the top surface 119 of the conductive fluid 116.

The number, locations, and configurations of the gate electrode(s) in the reservoir 114 of the gate structure 113 of the disclosed MSFETs 110.1, 110.2, 110.3 and 110.4 vary and, as a result, so does motion-sensitivity.

For example, referring to FIGS. 2A to 2C, a MSFET 110.1 can include a single gate electrode 118. The gate electrode 118 can be made of a metal or metal alloy material. The metal or metal alloy material of the gate electrode can be pre-selected so as to avoid the possibility of corrosion and/or oxygen formation thereon. Exemplary metal or metal alloy materials for the gate electrode include, but are not limited to, platinum or gold. In any case, the gate electrode 118 can be at a fixed location within the reservoir 114. For example, the fixed location of the gate electrode 118 can be between the bottom and the top of the reservoir 114 and such that, when the chip 102 is upright, level and stationary, the following conditions are met: (a) the channel region 112 and the top surface 119 of the conductive fluid 116 are parallel; (b) the top surface 119 of the conductive fluid 116 is at a given fill level 150; and (c) the gate electrode 118 is in contact with the conductive fluid 116, as shown in FIG. 2A. The fixed location of the gate electrode 118 can further be closer to a first side of the reservoir 114 than it is to a second side opposite the first side. As a result, when, due to tilt of the chip 102 upward on the first side (e.g., as shown in FIG. 2B) and/or acceleration ($\alpha$) of the chip 102 in a first direction from the second side toward the first side (e.g., as shown in FIG. 2C), the channel region 112 becomes angled to at least a specific degree (e.g., to at least a some specific angle ($\theta$)) relative to the top surface 119 of the conductive fluid 116 and the level of the conductive fluid 116 on the first side of the reservoir 114 drops so that the gate electrode 118 becomes physically separated from the conductive fluid 116.

Figure 3A:
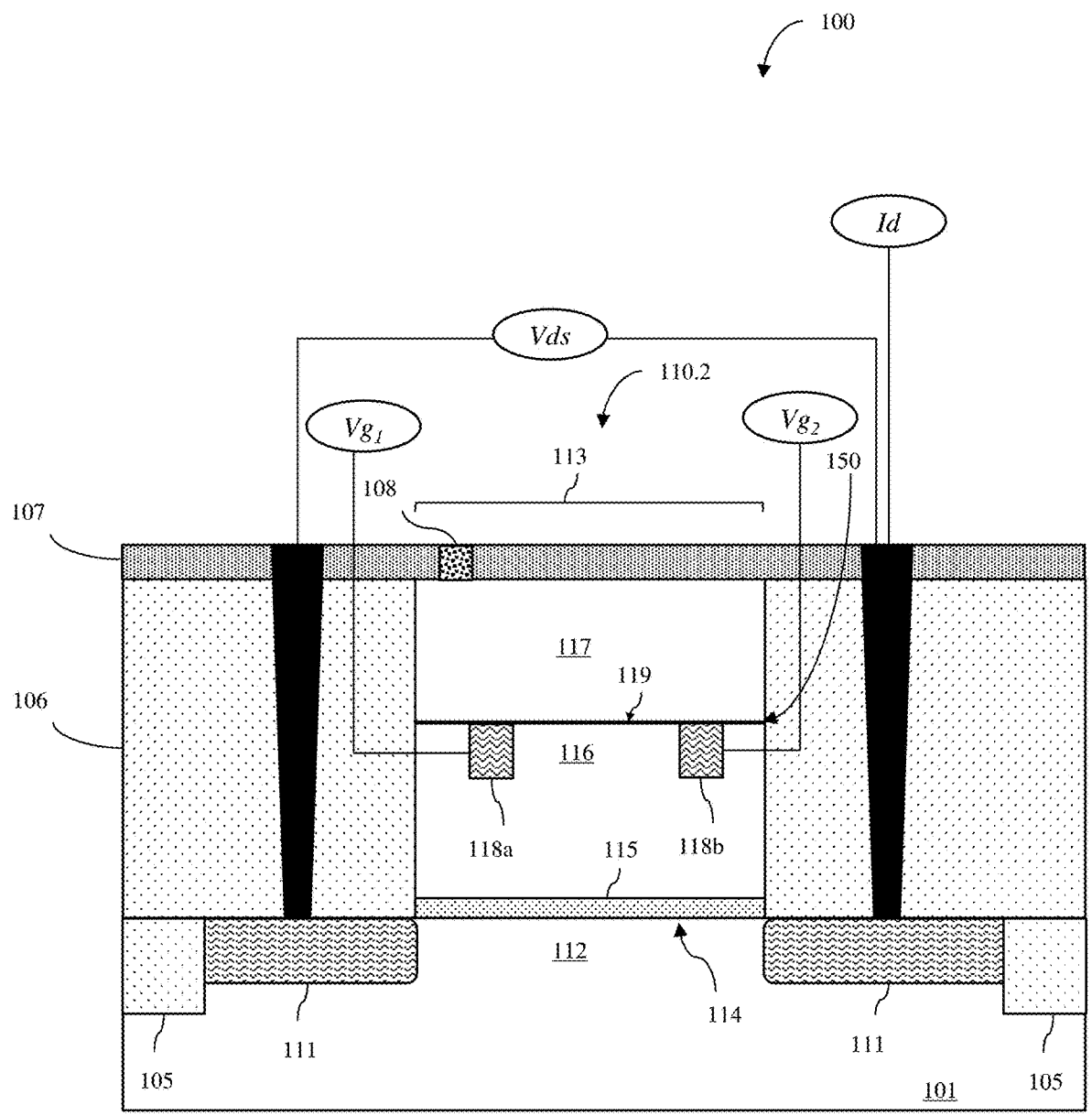
FIGS. 3A to 3C-2 are cross-section diagrams illustrating an alternative embodiment of a MSFET that can be incorporated into the MDS of FIG. 1.
Figures 1, 3B:
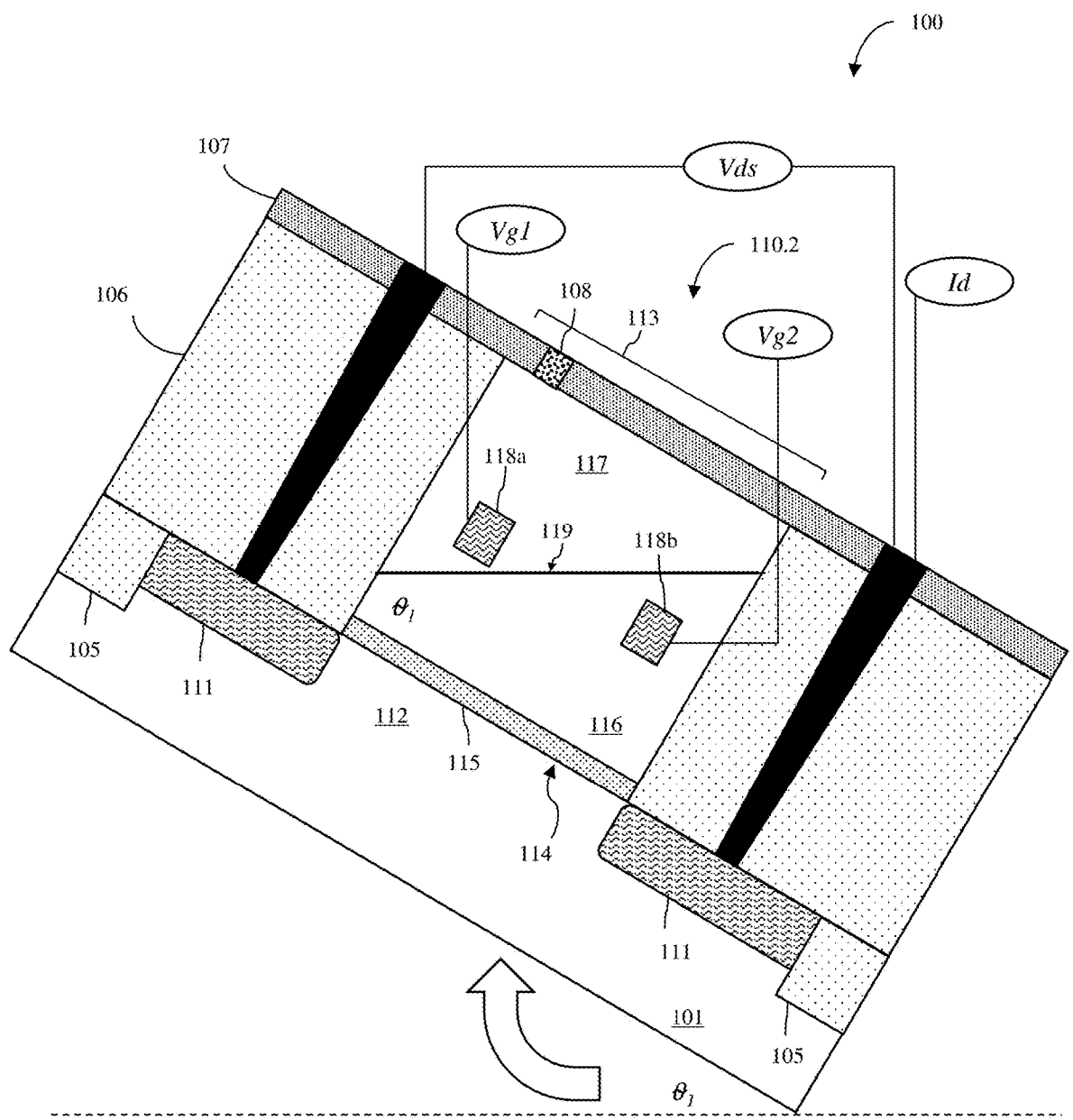
Figures 2, 3B:
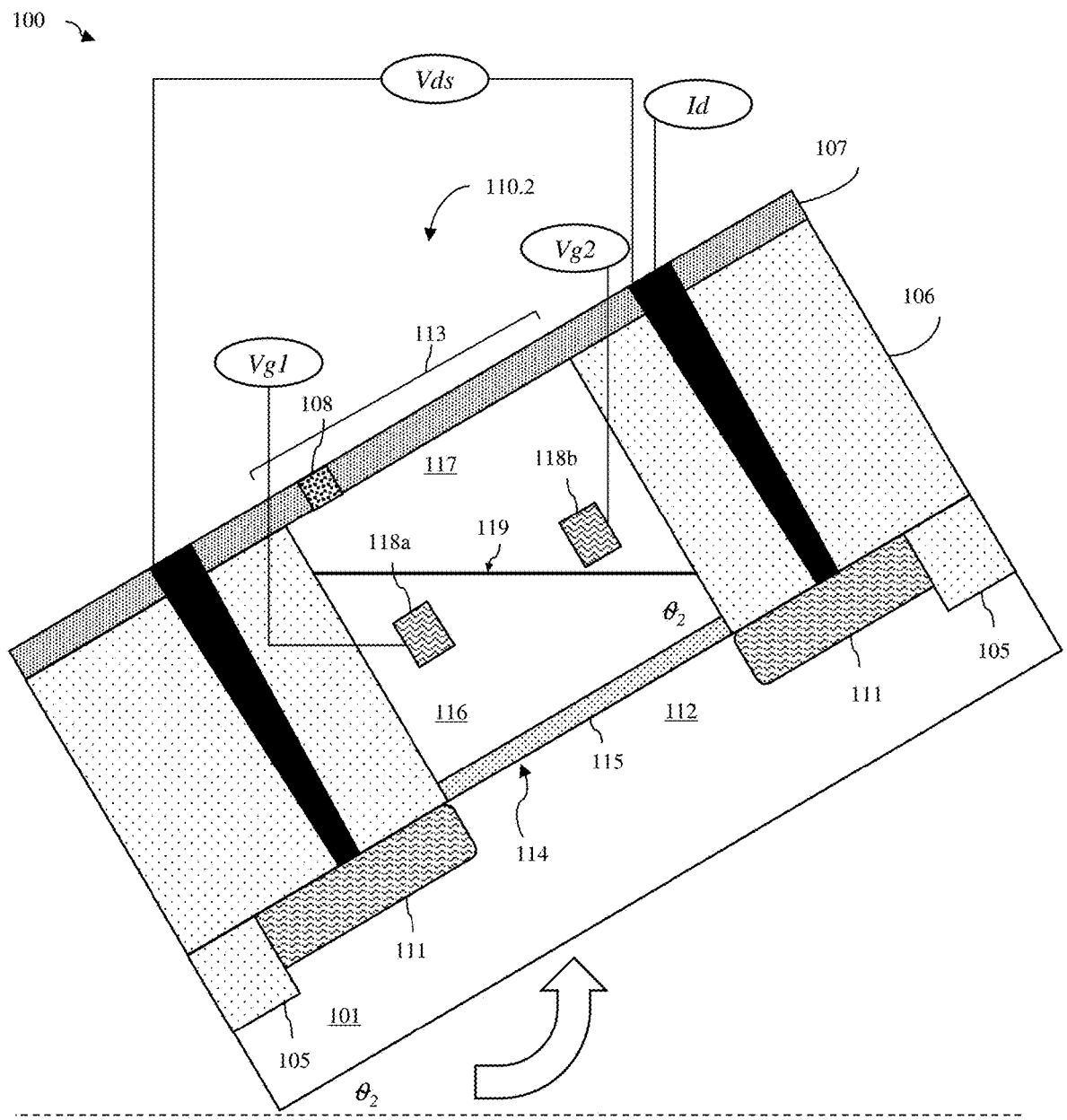
Figures 1, 3C:
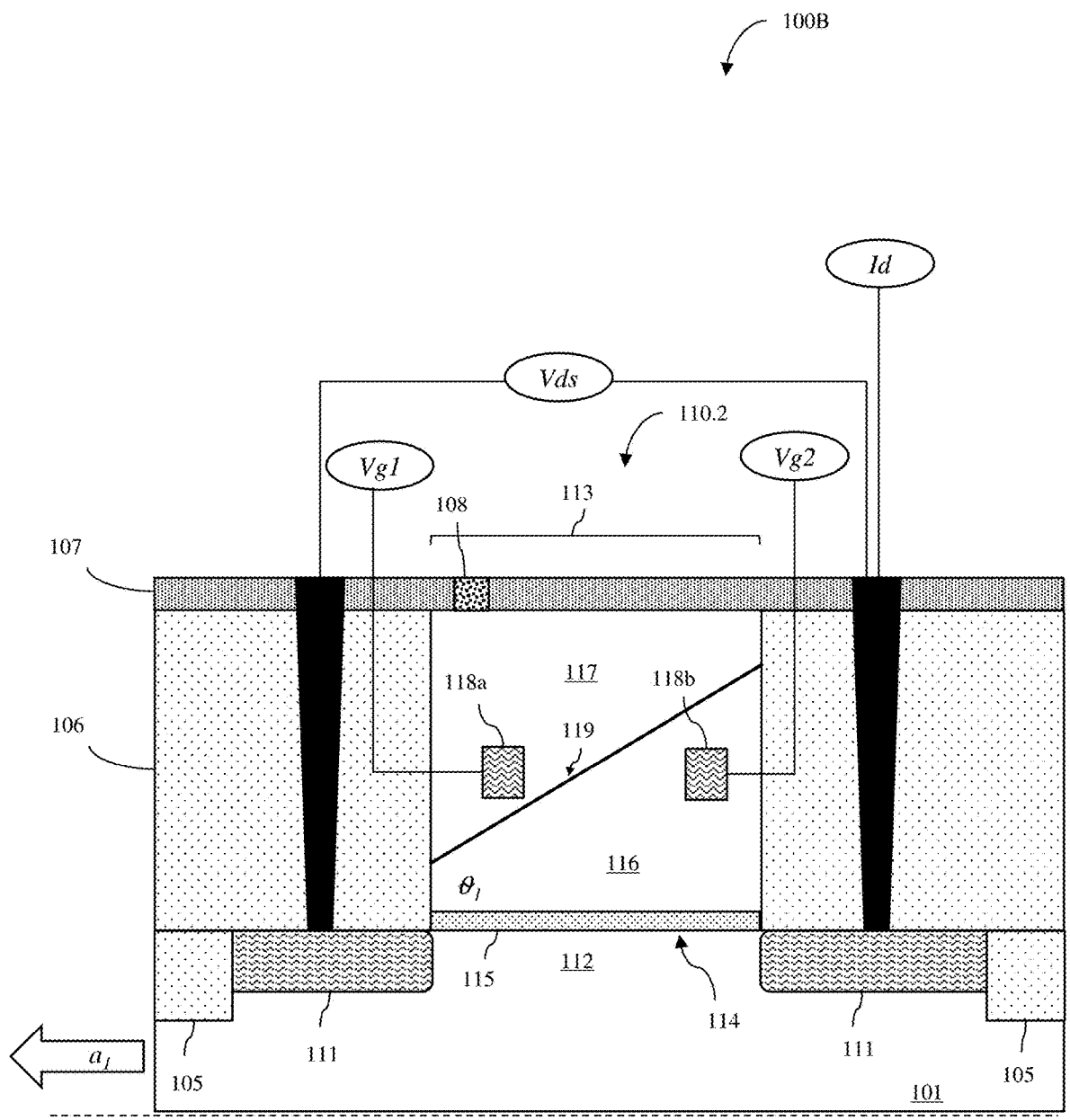
Figures 2, 3C:
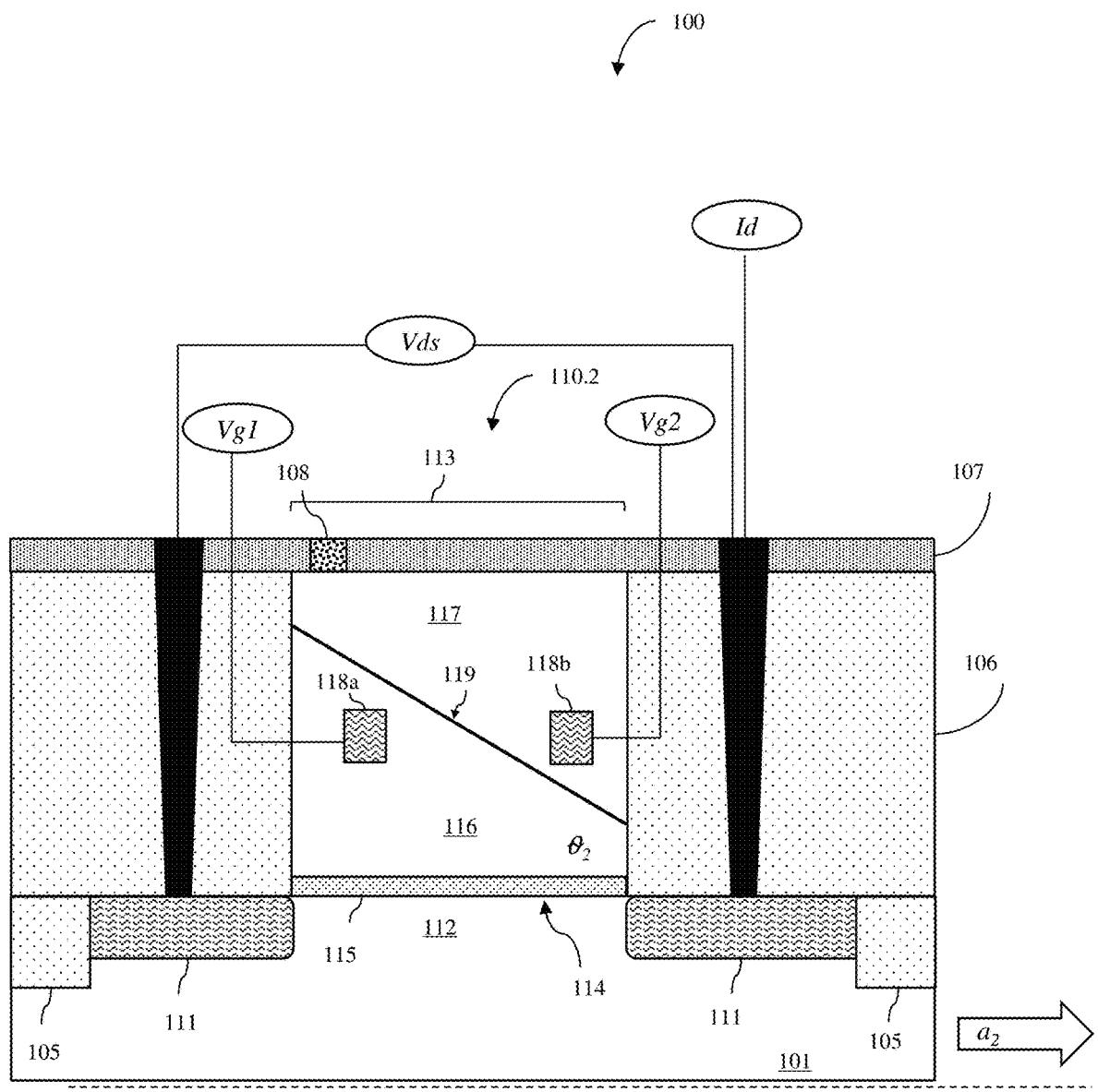

Referring to FIGS. 3A to 3C-2, a MSFET 110.2 can include multiple gate electrodes and, particularly, at least a first gate electrode 118a and a second gate electrode 118b. Each of the gate electrodes can each be made of a metal or metal alloy material. The metal or metal alloy material of the gate electrodes can be pre-selected so as to avoid the possibility of corrosion and/or oxygen formation thereon. Exemplary metal or metal alloy materials for the gate electrodes include, but are not limited to, platinum or gold. In any case, the first gate electrode 118a and the second gate electrode 118b can be located at different fixed locations within the reservoir 114. For example, the fixed locations of the gate electrodes (including the fixed locations of the first and second gate electrodes 118a-118b) can be between the bottom and the top of the reservoir 114 and such that, when the chip 102 is upright, level and stationary, the following conditions are met: (a) the channel region 112 and the top surface 119 of the conductive fluid 116 are parallel; (b) the top surface 119 of the conductive fluid 116 is at a given fill level 150; and (c) all of the gate electrodes (including the first and second gate electrodes 118a-118b) are in contact with the conductive fluid 116, as shown in FIG. 3A. The fixed locations of the gate electrodes can further be at different locations across the reservoir. For example, the first gate electrode 118a can be at a first location adjacent to a first side of the reservoir 114 and the second gate electrode 118b can be at a second location adjacent to a second side opposite the first side. As a result, when, due to tilt of the chip 102 upward on the first side (e.g., as shown in FIG. 3B-1) and/or acceleration ($\alpha_1$) of the chip 102 in a first direction from the second side toward the first side (e.g., as shown in FIG. 3C-1), the channel region 112 becomes angled to at least a specific first degree (e.g., to at least a some specific first angle ($\theta_1$)) relative to the top surface 119 of the conductive fluid 116 and the level of the conductive fluid 116 on the first side of the reservoir 114 drops so that the first gate electrode 118a becomes physically separated from the conductive fluid 116 (while the level of the conductive fluid 116 on the second side of the reservoir 114 is raised so that the second gate electrode 118b remains in contact with the conductive fluid 116). Furthermore, when, due to tilt of the chip 102 upward on the second side (e.g., as shown in FIG. 3B-2) and/or acceleration ($\alpha_2$)of the chip 102 in a second direction from the first side toward the second side (e.g., as shown in FIG. 3C-2), the channel region 112 becomes angled to at least a specific second degree (e.g., to at least a some specific second angle ($\theta_2$)) relative to the top surface 119 of the conductive fluid 116 and the level of the conductive fluid 116 on the second side of the reservoir 114 drops so that the second gate electrode 118b becomes physically separated from the conductive fluid 116 (while the level of the conductive fluid 116 on the first side of the reservoir is raised so that the first gate electrode 118a remains in contact with the conductive fluid 116).

Figure 4A:
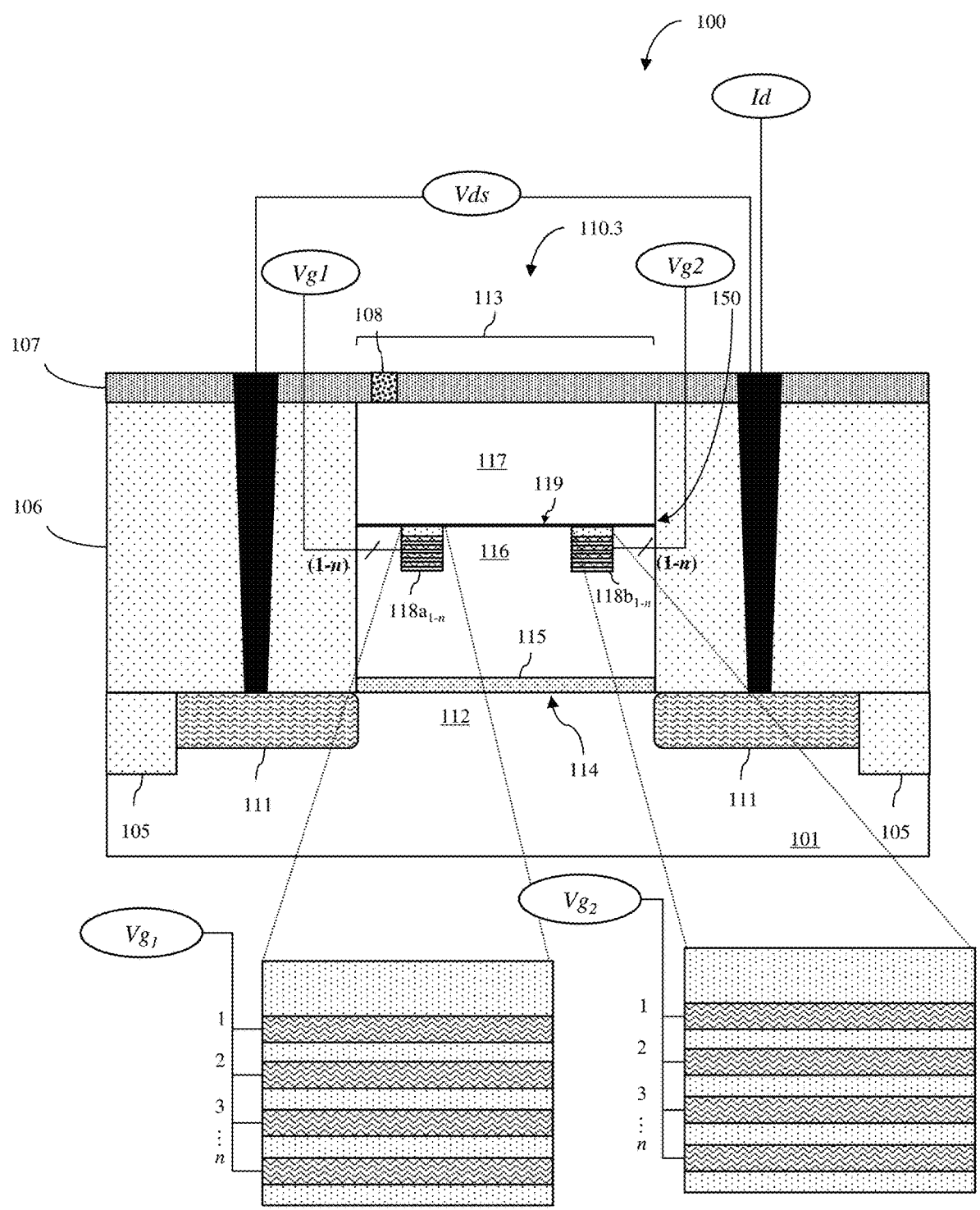
Figures 1, 4B:
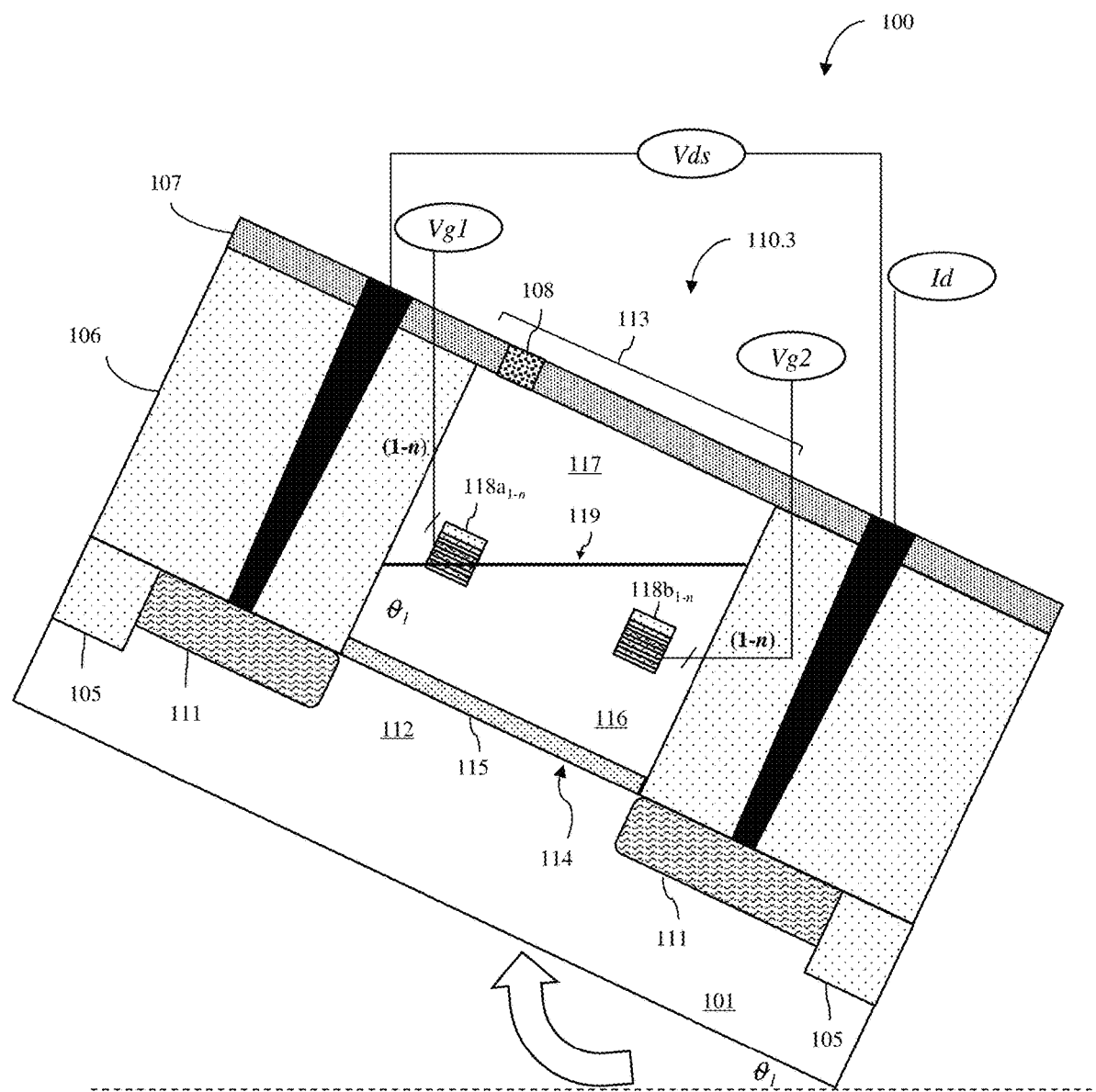
Figures 2, 4B:
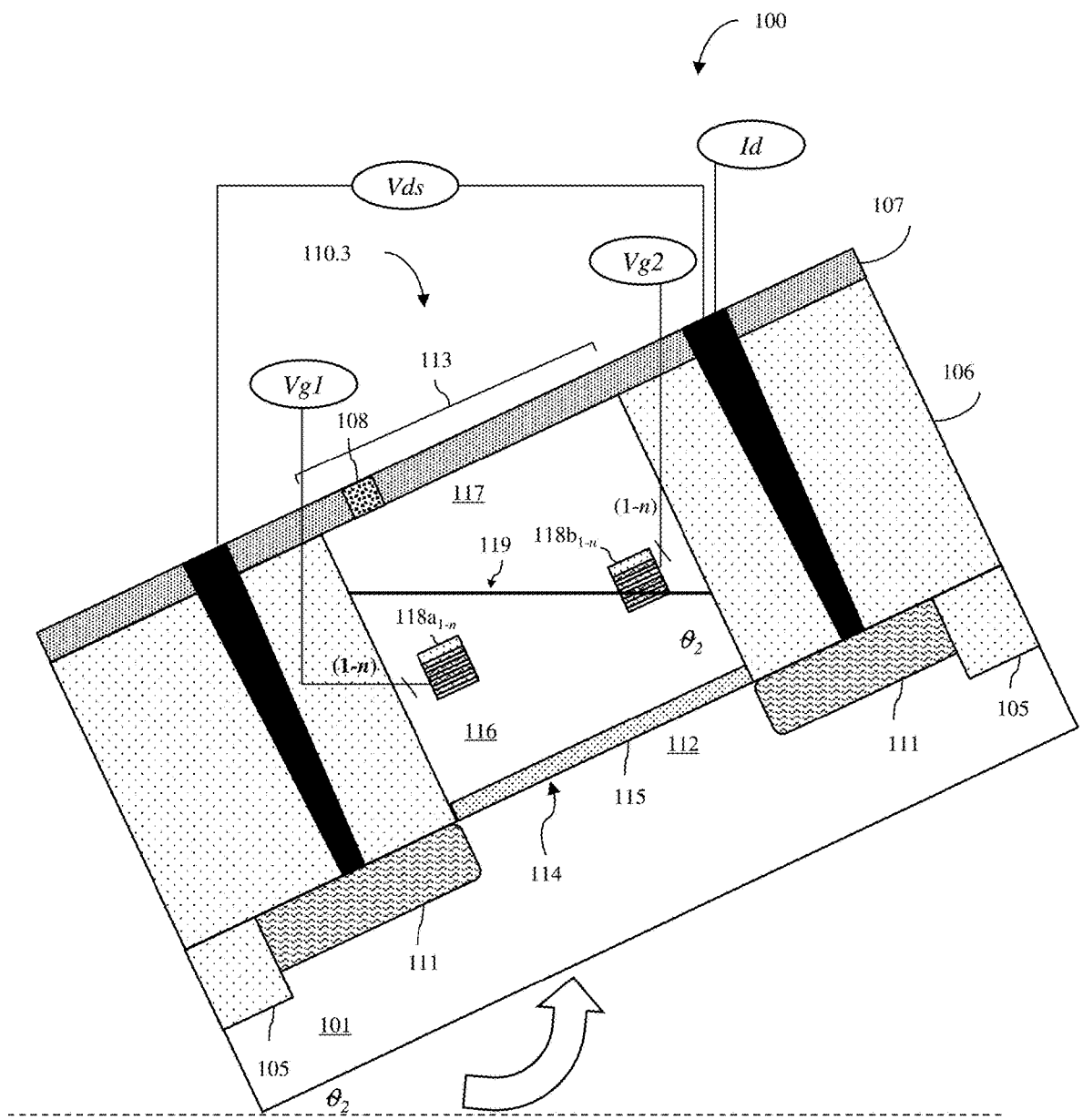
Figures 1, 4C:
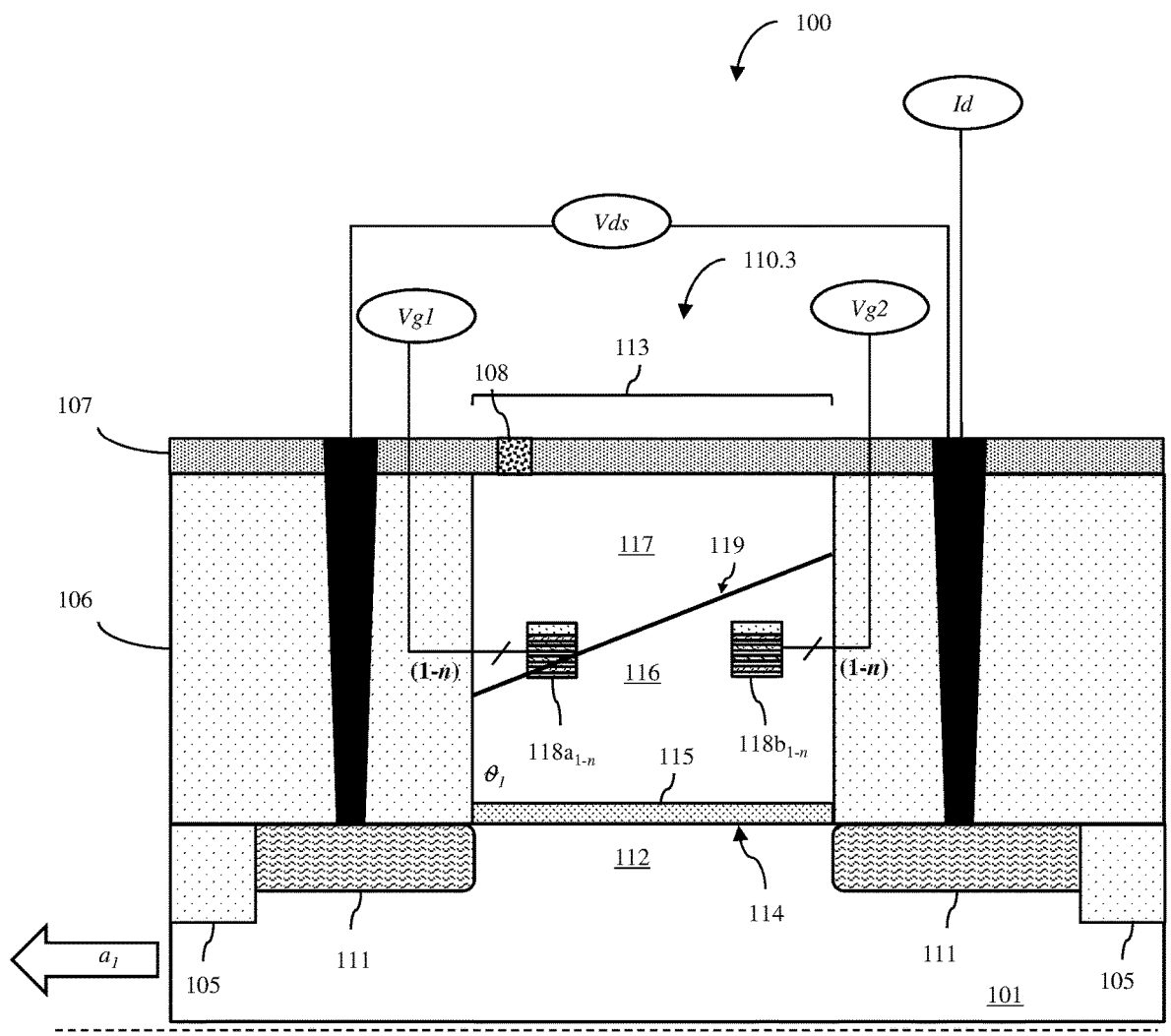
Figures 2, 4C:
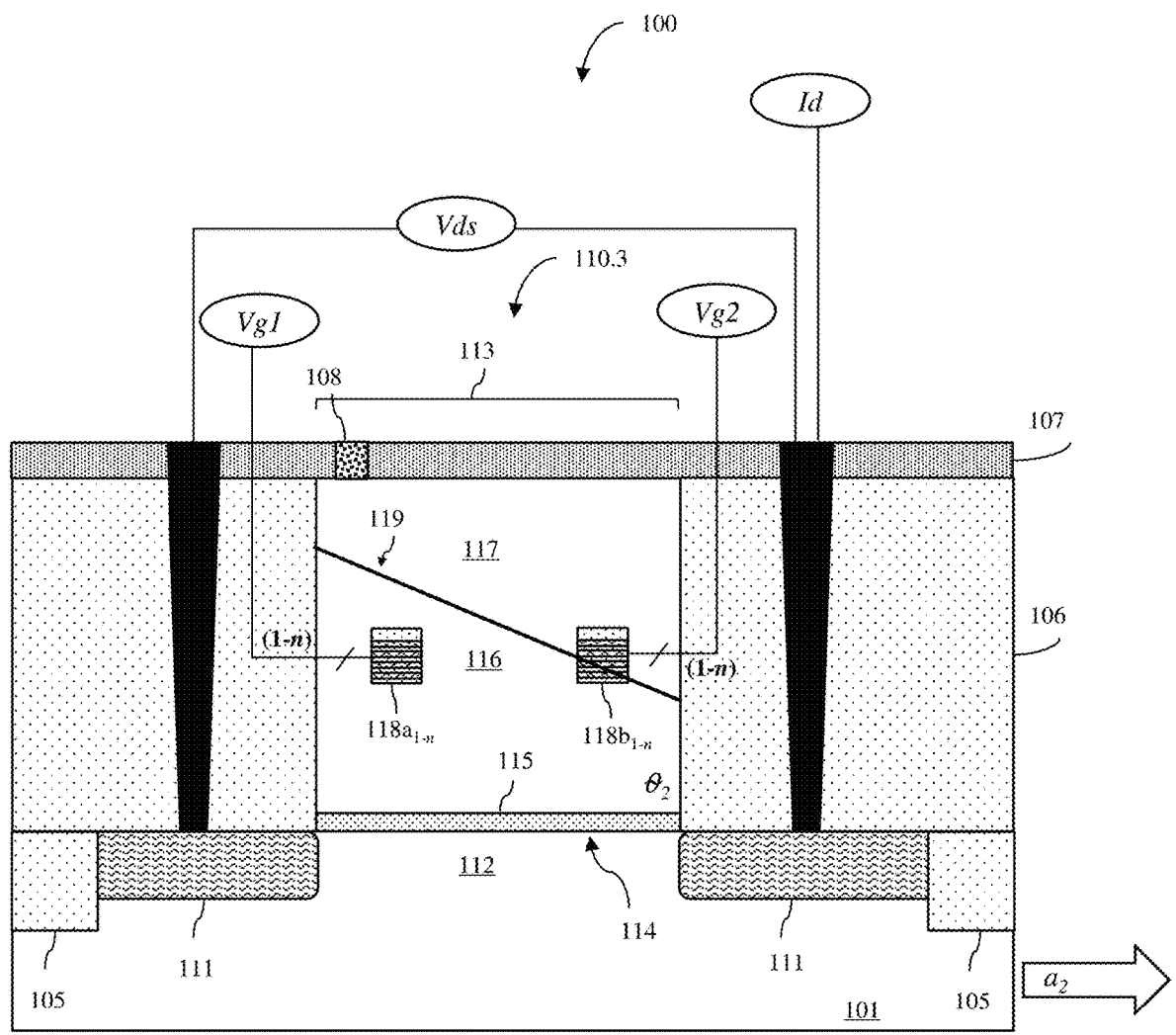

Referring to FIGS. 4A to 4C-2, a MSFET 110.3 can include multiple gate electrodes and, particularly, at least a first gate electrode $118a_{1-n}$ and a second gate electrode $118b_{1-n}$. However, instead of each gate electrode being made entirely of a metal or a metal alloy material, each gate electrode can include a stack of electrically isolated sub-electrodes. For example, the first gate electrode $118a_{1-n}$ can include a stack of electrically isolated first sub-electrodes (1-n) and the second gate electrode $118b_{1-n}$ can include a stack of electrically isolated second sub-electrodes (1-n). Each stack of electrically isolated sub-electrodes can include alternating layers of an isolation material and a metal or metal alloy material such that the metal or metal alloy material of one sub-electrode is electrically isolated from the metal or metal alloy material of all other sub-electrodes in the stack. The metal or metal alloy material can be pre-selected so as to avoid the possibility of corrosion and/or oxygen formation thereon. Exemplary metal or metal alloy materials include, but are not limited to, platinum or gold. In any case, as with the previously described embodiment, the gate electrodes can be located at different fixed locations within the reservoir 114. For example, the fixed locations of the gate electrodes (including the fixed locations of the first and second gate electrodes $118a_{1-n}$ and $118b_{1-n}$) can be between the bottom and the top of the reservoir 114 and such that, when the chip 102 is upright, level and stationary, the following conditions are met: (a) the channel region 112 and the top surface 119 of the conductive fluid 116 are parallel; (b) the top surface 119 of the conductive fluid 116 is at a given fill level 150; and (c) all of the sub-electrodes of all of the gate electrodes (including the first sub-electrodes 1-n of the first gate electrode $118a_{1-n}$ and the second sub-electrodes 1-n of the second gate electrode $118b_{1-n}$) are in contact with the conductive fluid 116, as shown in FIG. 4A. The fixed locations of the gate electrodes can be at different locations across the reservoir. For example, the first gate electrode $118a_{1-n}$ can be at a first location adjacent to a first side of the reservoir 114 and the second gate electrode $118b_{1-n}$ can be at a second location adjacent to a second side opposite the first side. As a result, when, due to tilt of the chip 102 upward on the first side (e.g., as shown in FIG. 4B-1) and/or acceleration ($\alpha_1$) of the chip 102 in a first direction from the second side toward the first side (e.g., as shown in FIG. 4C-1), the channel region 112 becomes angled to progressively increasing first degrees (e.g., to progressively increasing first angles ($\theta_1$)) relative to the top surface 119 of the conductive fluid 116 and the level of the conductive fluid 116 on the first side of the reservoir 114 drops so that the first sub-electrodes 1-n of the first gate electrode $118a_{1-n}$ become physically separated from the conductive fluid 116 in order from the top down (i.e., 1 to n) (while the level of the conductive fluid 116 on the second side of the reservoir is raised so the second sub-electrodes 1-n of the second gate electrode $118b_{1-n}$ remain in contact with the conductive fluid 116). Furthermore, when, due to tilt of the chip 102 upward on the second side (e.g., as shown in FIG. 4B-2) and/or acceleration ($\alpha_2$) of the chip 102 in a second direction from the first side toward the second side (e.g., as shown in FIG. 4C-2), the channel region 112 becomes angled to progressively increasing second degrees (e.g., to progressively increasing second angles ($\theta_2$)) relative to the top surface 119 of the conductive fluid 116 and the level of the conductive fluid 116 on the second side of the reservoir 114 drops so that the second sub-electrodes 1-n of the second gate electrode $118b_{1-n}$ become physically separated from the conductive fluid 116 in order from top down (i.e., 1-n) (while the level of the conductive fluid 116 on the first side of the reservoir 114 is raised so that the first sub-electrodes 1-n of the first gate electrode $118a_{1-n}$ remain in contact with the conductive fluid 116).

Figure 5A:
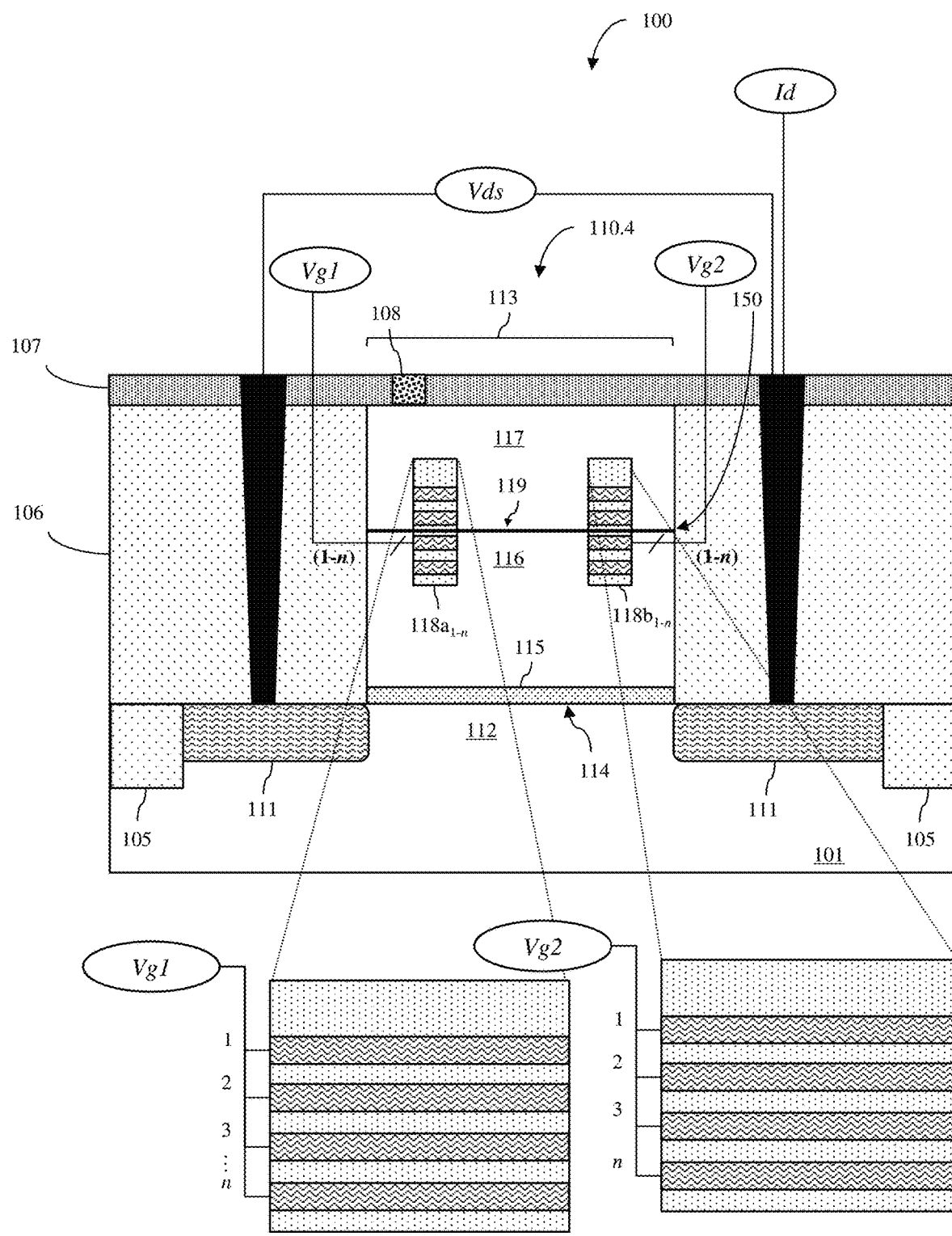
Figures 1, 5B:
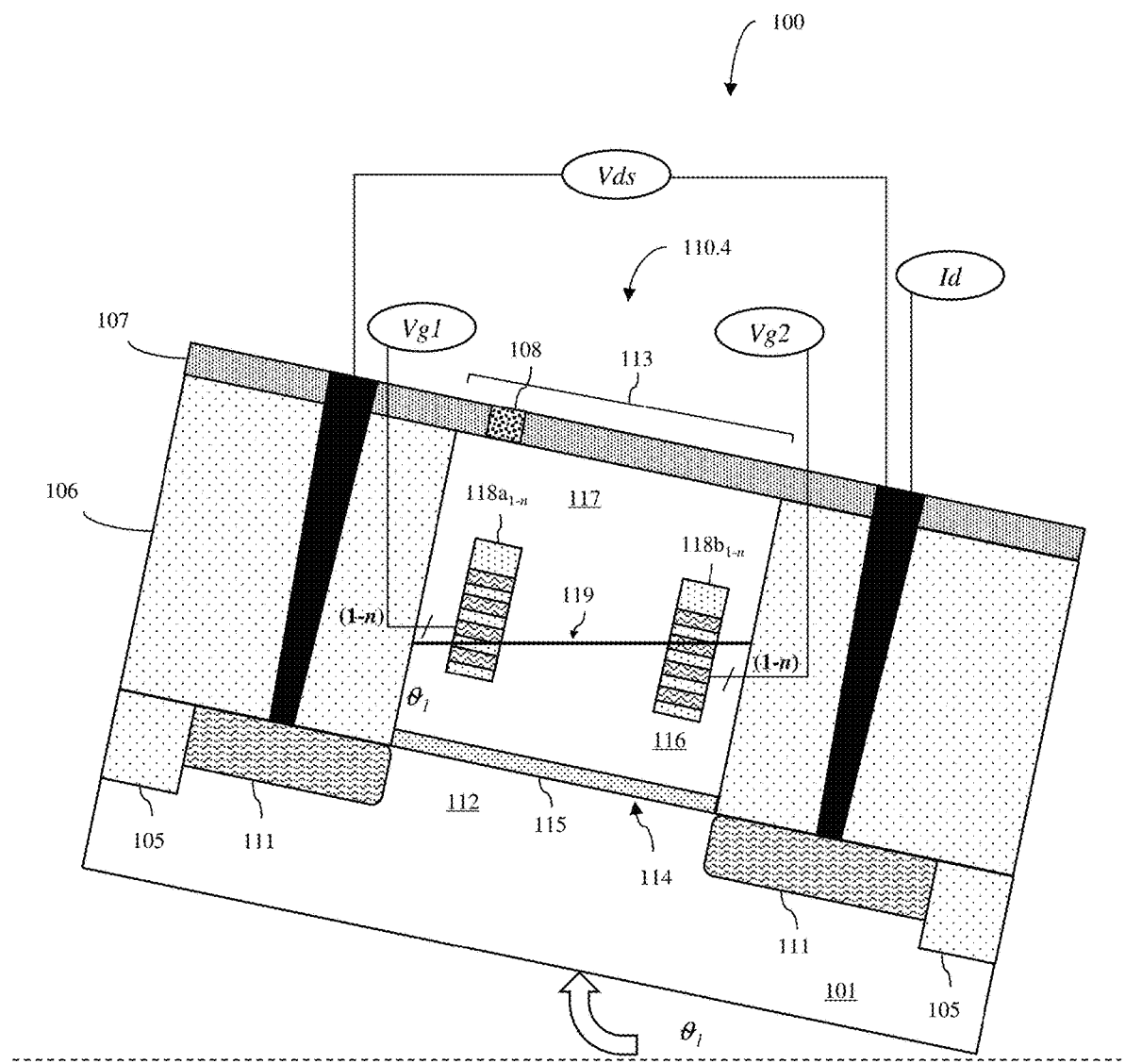
Figures 2, 5B:
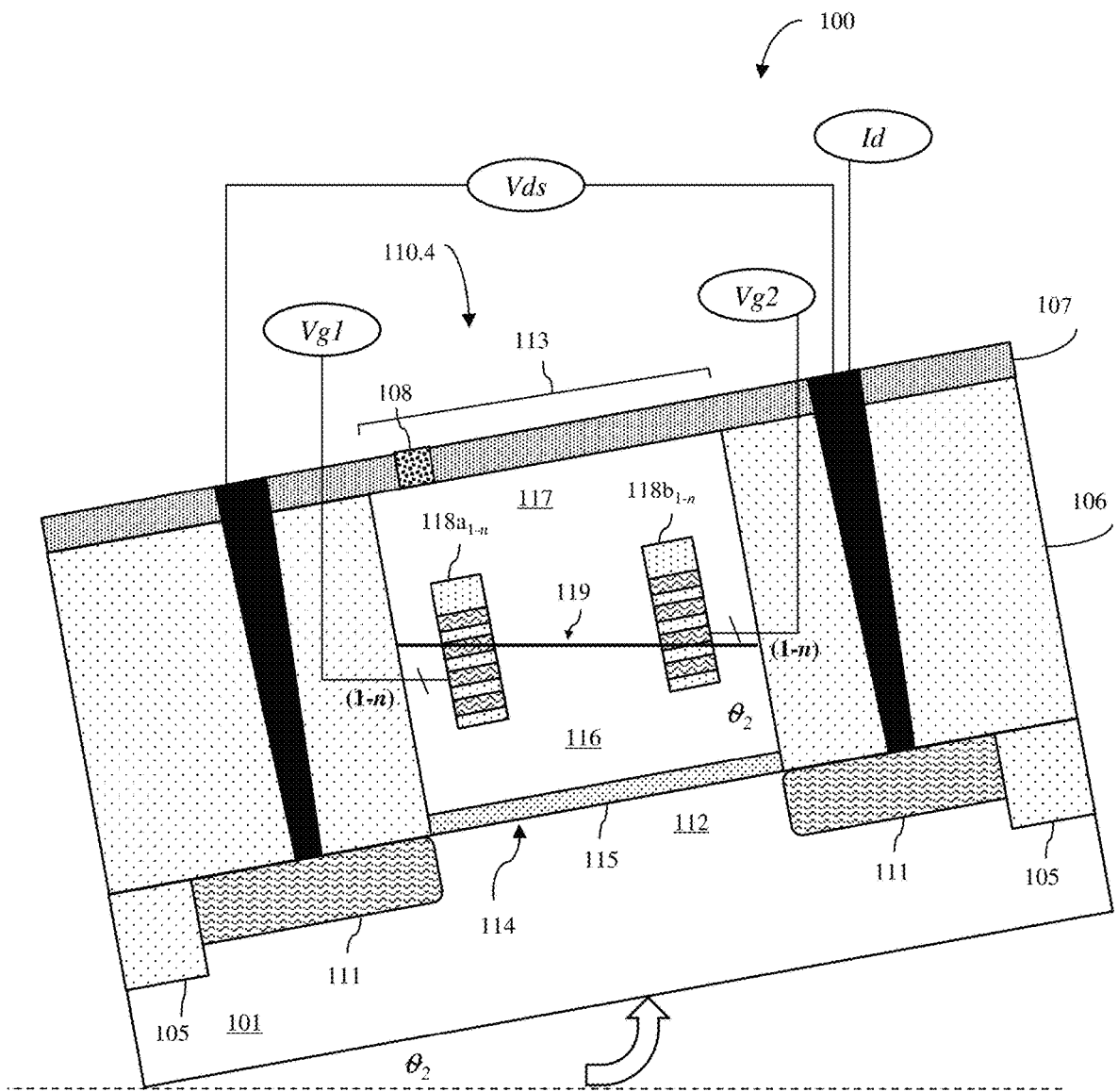
Figures 1, 5C:
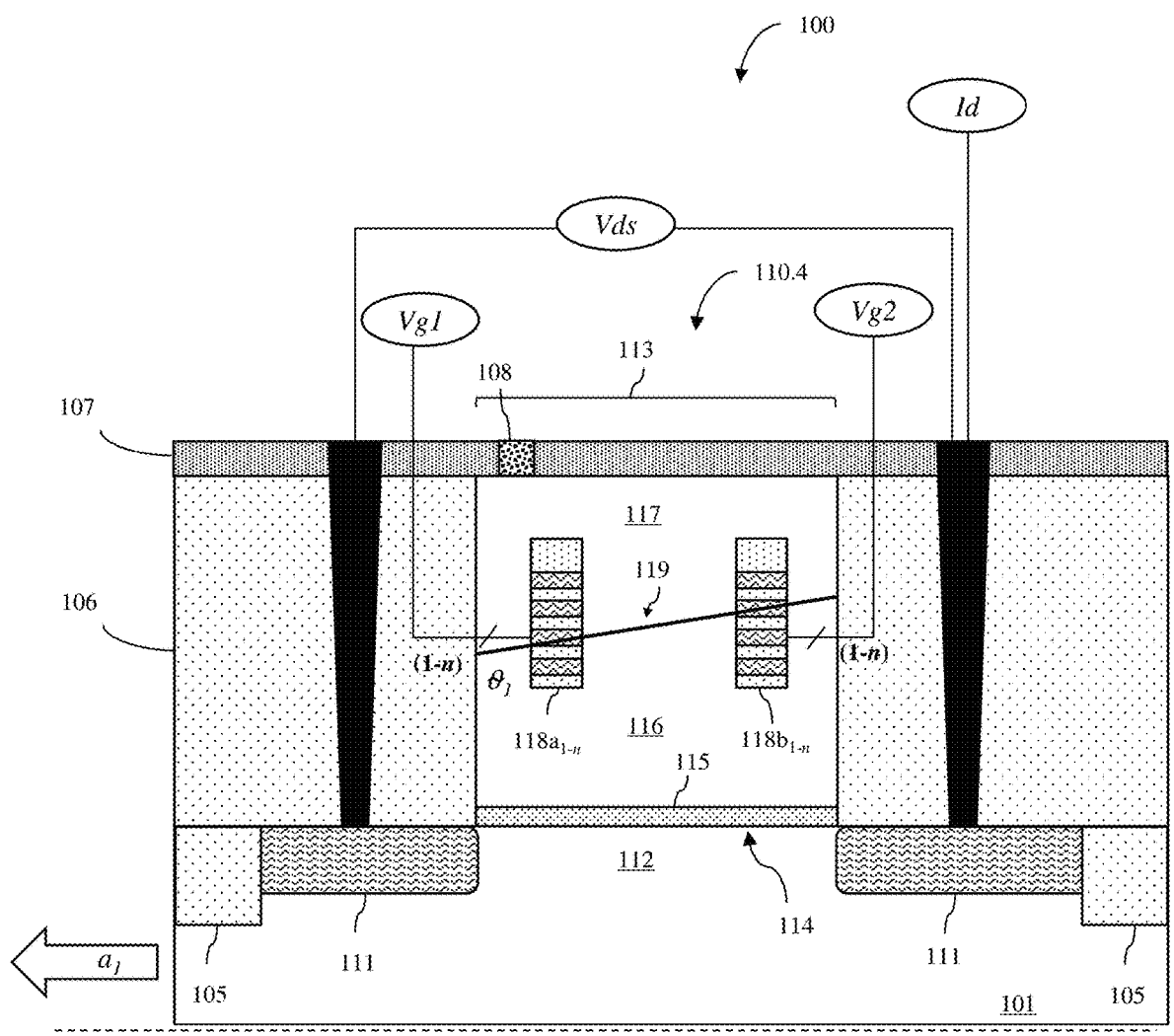
Figures 2, 5C:
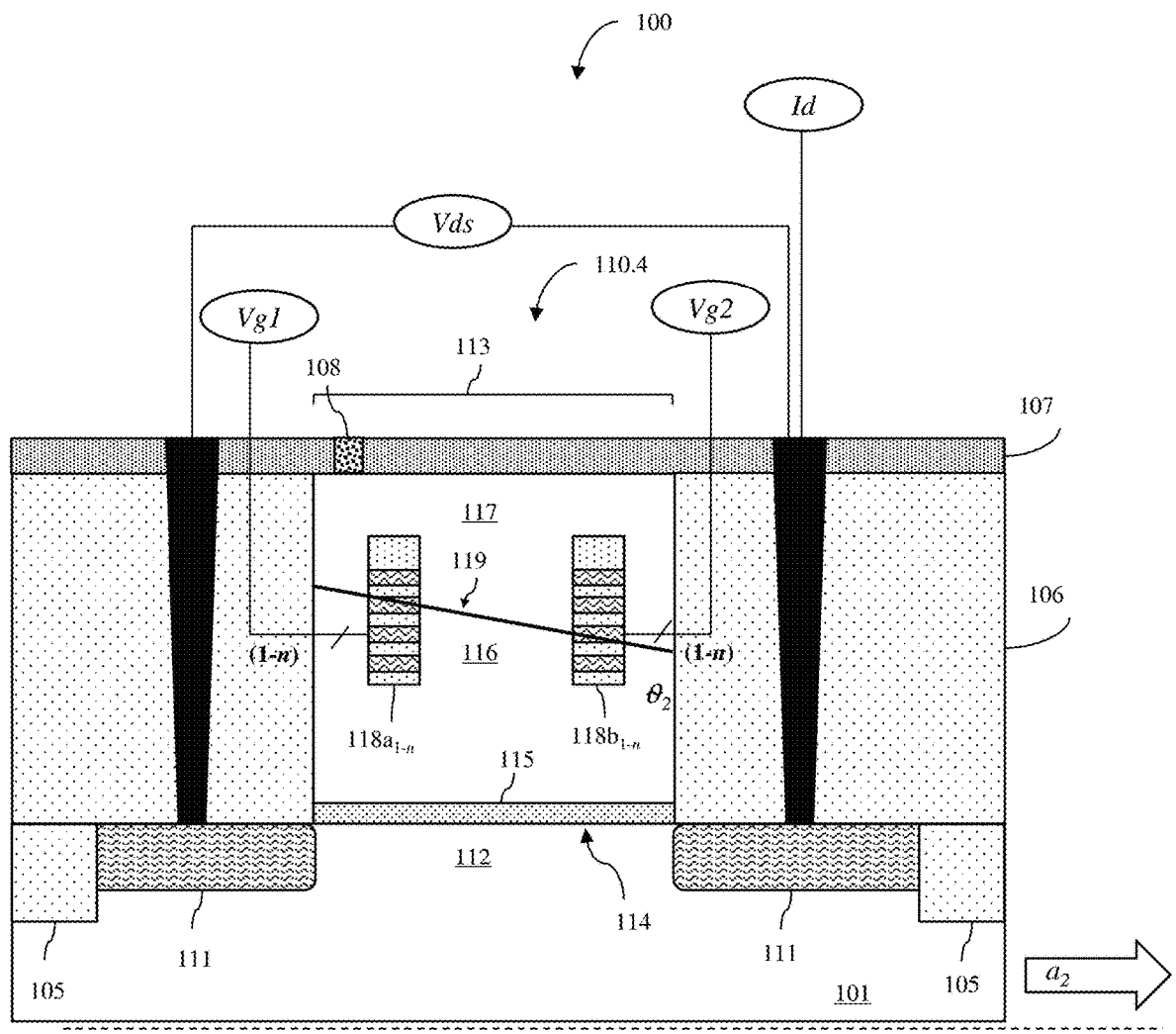

Referring to FIGS. 5A to 5C-2, a MSFET 110.4 can include multiple gate electrodes and, particularly, at least a first gate electrode $118a_{1-n}$ and a second gate electrode $118b_{1-n}$. As with the MSFET 110.3, instead of each gate electrode being made entirely of a metal or a metal alloy material, each gate electrode can include a stack of electrically isolated sub-electrodes 1-n. That is, the first gate electrode $118a_{1-n}$ can include a stack of electrically isolated first sub-electrodes 1-n and the second gate electrode $118b_{1-n}$ can include a stack of electrically isolated second sub-electrodes 1-n. Each stack of electrically isolated sub-electrodes can include alternating layers of an isolation material and a metal or metal alloy material such that the metal or metal alloy material of one sub-electrode is electrically isolated from the metal or metal alloy material of all other sub-electrodes in the stack. The metal or metal alloy material can be pre-selected so as to avoid the possibility of corrosion and/or oxygen formation thereon. Exemplary metal or metal alloy materials include, but are not limited to, platinum or gold. In any case, the gate electrodes can be located at different fixed locations within the reservoir 114. For example, the fixed locations of the gate electrodes (including the fixed locations of the first and second gate electrodes $118a_{1-n}$ and $118b_{1-n}$) can be between the bottom and the top of the reservoir 114 and such that, when the chip 102 is upright, level and stationary, the following conditions are met: (a) the channel region 112 and the top surface 119 of the conductive fluid 116 are parallel; (b) the top surface 119 of the conductive fluid 116 is at a given fill level 150; and (c) only lower ones of the sub-electrodes of in each gate electrode (including lower ones of the first sub-electrodes of the first gate electrode $118a_{1-n}$ and lower ones of the second sub-electrodes of the second gate electrode $118b_{1-n}$) are in contact with the conductive fluid 116 while upper ones of the sub-electrodes of each of the first and second gate electrode $118a_{1-n}$ and $118b_{1-n}$ are above the level of the top surface 119 of the conductive fluid 116, as shown in FIG. 5A. The fixed locations of the gate electrodes can be at different locations across the reservoir 114. For example, the first gate electrode $118a_{1-n}$ can be at a first location adjacent to a first side of the reservoir 114 and the second gate electrode $118b_{1-n}$ can be at a second location adjacent to a second side opposite the first side. As a result, when, due to tilt of the chip 102 upward on the first side (e.g., as shown in FIG. 5B-1) and/or acceleration ($α_1$) of the chip 102 in a first direction from the second side toward the first side (e.g., as shown in FIG. 5C-1), the channel region 112 becomes angled to progressively increasing first degrees (e.g., to progressively increasing first angles ($θ_1$)) relative to the top surface 119 of the conductive fluid 116 and the level of the conductive fluid 116 on the first side of the reservoir 114 drops so that the lower ones of the first sub-electrodes of the first gate electrode $118a_{1-n}$ become physically separated from the conductive fluid 116 in order from the top down (while the level of the conductive fluid 116 on the second side of the reservoir 114 is raised so that the upper ones of the second sub-electrodes of the second gate electrode $118b_{1-n}$ begin to contact the conductive fluid 116 in order from bottom up). Furthermore, when, due to tilt of the chip 102 upward on the second side (e.g., as shown in FIG. 5B-2) and/or acceleration ($α_2$) of the chip 102 in a second direction from the first side toward the second side (e.g., as shown in FIG. 5C-2), the channel region 112 becomes angled to progressively increasing second degrees (e.g., to progressively increasing second angles ($θ_2$)) relative to the top surface 119 of the conductive fluid 116 and the level of the conductive fluid 116 on the second side of the reservoir 114 drops so that the lower ones of the second sub-electrodes of the second gate electrode $118b_{1-n}$ become physically separated from the conductive fluid 116 in order from top down (i.e., 1-n) (while the level of the conductive fluid 116 on the first side of the reservoir 114 is raised so that the upper ones of the first sub-electrodes of the first gate electrode $118a_{1-n}$ begin to contact the conductive fluid 116 from bottom up).

It should be understood that the gate electrode(s) described above and illustrated in the drawings are not intended to be limiting.

Figure 6A:
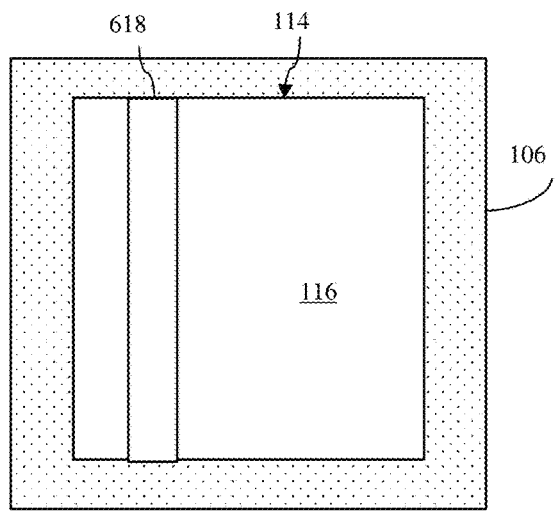
FIGS. 6A-6D are exemplary layout diagrams for the gate electrode(s) in some MSFET embodiments.
Figure 6B:
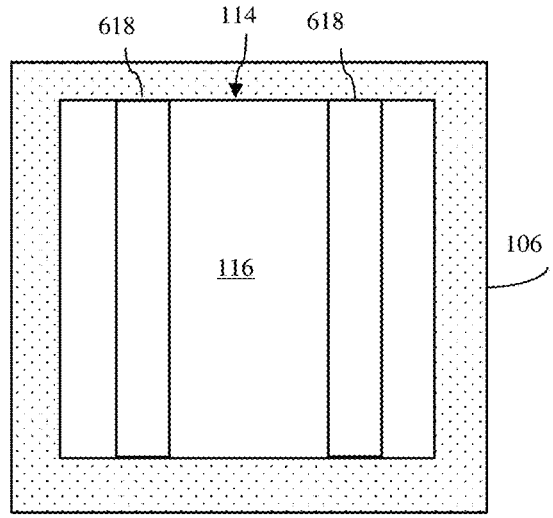
Figure 6C:
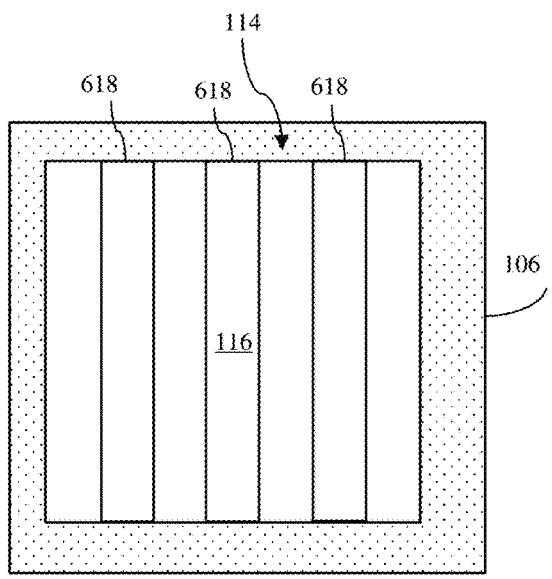
Figure 6D:
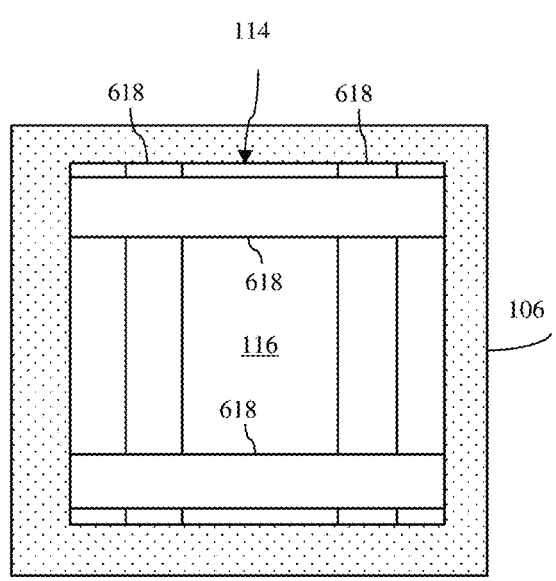

For example, any number of one or more gate electrode(s) could be incorporated into a MSFET (e.g., see exemplary gate electrode(s) 618 in the layout diagrams of FIGS. 6A-6D). Furthermore, if a MSFET has more than two gate electrodes, those gate electrodes 618 (whether they include a single electrode or a stack of electrically isolated sub-electrodes) could be evenly distributed across the width of the reservoir (e.g., as shown in FIG. 6C), placed on each side of the reservoir (e.g., as shown in FIG. 6D), etc.

Additionally, any number (e.g., 2, 3, 4 as illustrated, 5, etc.) of sub-electrodes could be incorporated into the stack of electrically isolated sub-electrodes in each gate electrode $118a_{1-n}$ and $118b_{1-n}$ in the gate structure 113 of the MSFETs 110.3 and 110.4.

Figure 7:
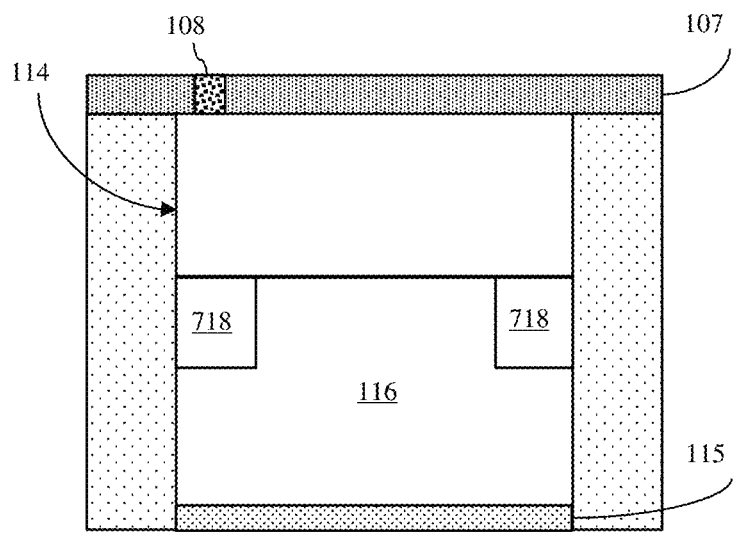
FIGS. 7-9 are cross-section diagrams illustrating alternative gate electrode configurations in some MSFET embodiments.
Figure 8:
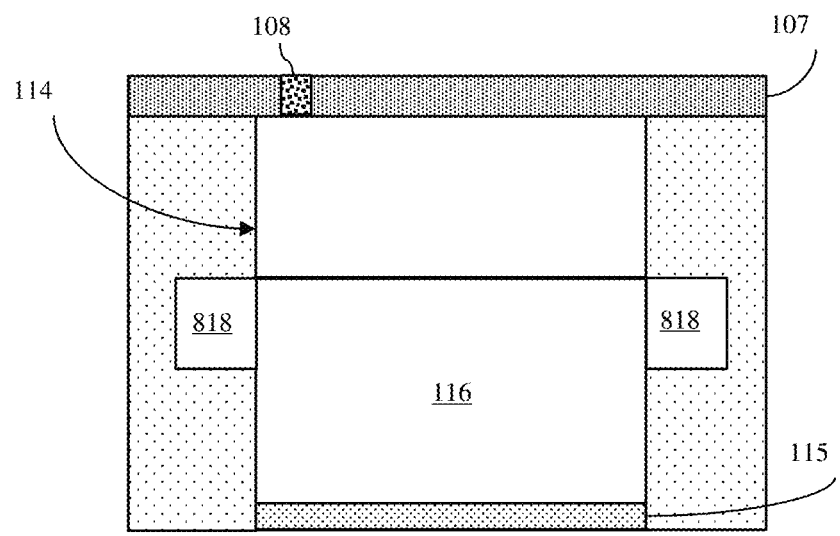
Figure 9:
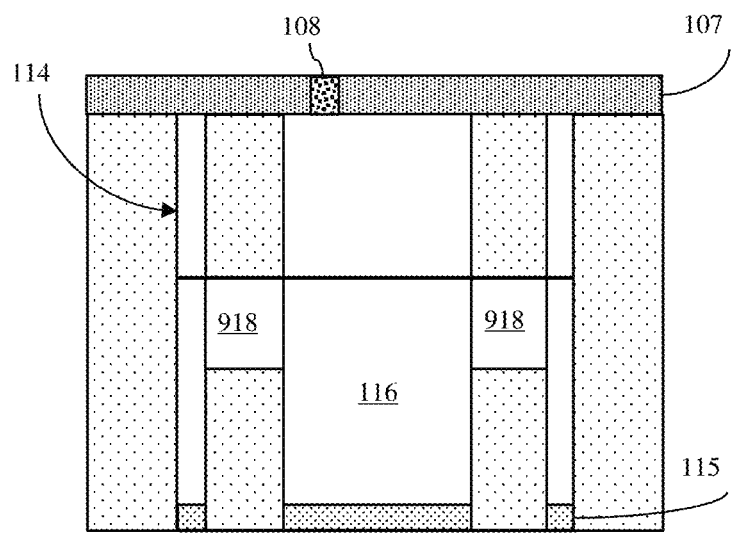

Finally, various different known processing techniques could be employed to form the above-described gate electrode(s) 118 of the MSFET 110.1, 118a and 118b of the MSFET 110.2, and $118a_{1-n}$ and $118b_{1-n}$ of the MSFET 110.3 or 110.4, at fixed location(s) within a reservoir 114. The illustration of the gate electrode(s) shown in the drawings allow the reader to focus on the salient aspects of the disclosed embodiments. However, it should be understood that a support structure is also required for maintaining (i.e., anchoring, securing, etc.) each gate electrode at a fixed location within the reservoir 114 (i.e., relative to the bottom, top and sides of the reservoir) despite movement (e.g., tilt and/or acceleration) of the chip 102 on which the MSFET is formed. For example, in some embodiments, as shown in the layout diagrams of FIGS. 6A-6D, each gate electrode 618 can be a thin bar, which extends laterally across the full width of the interior of the reservoir 114 from one sidewall to the opposite sidewall and which has ends attached to the sidewalls. In the case of the structure shown in FIG. 6D, gate electrodes that traverse the reservoir in different directions can be located at different heights to avoid direct electrical connections. In other embodiments, each gate electrode 718 can be a bump that protrudes into the interior of the reservoir 114 from one sidewall, as shown in FIG. 7. In other embodiments, each gate electrode 818 can be embedded in the dielectric material 106 and can have only one vertical surface exposed to the interior of the reservoir 114, as shown in FIG. 8. In still other embodiments, each gate electrode 918 can be embedded in a dielectric pillar or column, which extends vertically through the interior of the reservoir 114 and which has ends attached to the reservoir bottom and/or the dielectric cap layer (e.g., see FIG. 9). In any case, one or more metal or metal alloy side surfaces of each gate electrode (or each sub-electrode thereof) should be exposed to the interior of the reservoir 114 in order to enable contact with the conductive fluid 116.

In addition to the features described above, interconnects (e.g., vias and/or wires) can be included in the dielectric material 106 and/or within dielectric support structures for the gate electrodes in order to provide discrete electrical connections to each gate electrode and, if applicable, to each sub-electrode within each gate electrode.

As mentioned above, with such a MSFET structure, an electrical property will vary as a function of the total effective gate voltage applied to the conductive fluid through the gate electrode(s) (or sub-electrodes thereof) and the total effective gate voltage applied to the conductive fluid will vary as a function of which ones of gate electrode(s) (or, if applicable, which ones of the sub-electrodes thereof) is/are in contact with the conductive fluid. Since contact between the conductive fluid and the gate electrode(s) (or sub-electrodes thereof) is motion-dependent, chip motion (e.g., chip tilt and/or acceleration) can be characterized based on the measured value of the electric property in response to specific bias conditions.

Therefore, referring again to FIG. 1, the disclosed motion detection system (MDS) 100 can further include a bias circuit 199, which is on chip 102, which is electrically connected to the MSFET (e.g., to MSFET 110.1, 110.2, 110.3, or 110.4), and which is configured to apply specific bias conditions to the MSFET. The MDS 100 can further include a sense circuit 198, which is also on the chip 102, which is electrically connected to the MSFET (e.g., to MSFET 110.1, 110.2, 110.3 or 110.4), and which is configured to sense (e.g., detect and measure) an electrical property of the MSFET 110.1, 110.2, 110.3, or 110.4 in response to the specific bias conditions. The MDS 100 can further include a controller (e.g., a processor), which is either on the chip 102 (e.g., see controller 190) or off but in communication with the chip 102 (e.g., see controller 190'), which is specifically in communication with the bias circuit 199 and the sense circuit 198, and which can characterize chip motion (e.g., chip tilt and/or acceleration) based on the measured value of the electrical property in response to the specific bias conditions.

As mentioned above and discussed in greater detail below, motion-sensitivity can be improved by increasing the number of gate electrodes within a MSFET and/or by incorporating stacked electrically isolated sub-electrodes within each gate electrode in the MSFET. That is, a MDS 100 that includes the MSFET 110.2 will be more motion sensitive (i.e., provide better chip motion characterization) than a MDS 100 that includes the MSFET 110.1, a MDS 100 that includes the MSFET 110.3 will be more motion sensitive than a MDS 100 that includes the MSFET 110.2, and so on.

Various different modes of operations could be employed for using the MSFET as a motion sensor within the MDS 100.

In exemplary embodiments, the bias circuit 199 could be electrically connected to the source/drain regions 111 and, optionally, the body region of the MSFET and can be configured to apply a fixed drain-source voltage (Vds) between the source/drain regions 111. The bias circuit 199 could further be electrically connected to each gate electrode and could be configured to apply a specific gate voltage to that gate electrode. In the case of multiple gate electrodes, the bias circuit 199 can be configured to apply different gate voltages to the different gate electrodes. In the case of a gate electrode that includes a stack electrically isolated sub-electrodes, the bias circuit 199 could be electrically connected (e.g., via a corresponding bus) to each sub-electrode so that the same gate voltage can be concurrently applied to each sub-electrode of that gate electrode (e.g., see FIG. 4A or FIG. 5A). In the case of multiple gate electrodes, each with a corresponding stack of electrically isolated sub-electrodes, the bias circuit 199 can be configured to apply the same gate voltage to all sub-electrodes in the same stack but different gate voltages to the sub-electrodes of different stacks. As discussed in greater detail below, the specific gate voltage(s) applied to the gate electrodes (or sub-electrodes thereof) can be preselected to achieve optimal chip motion detection sensitivity, while minimizing electrode-to-electrode leakage in the conductive fluid. In these exemplary embodiments, the sense circuit 198 could be electrically connected to the drain region of the MSFET and can be configured to sense (i.e., detect and measure) drain current (Id).

For example, for the MSFET 110.1 shown in FIGS. 2A-2C and described above, the bias circuit 199 can be electrically connected to the gate electrode 118 and can be configured to apply a fixed gate voltage ($V_g$) to that gate electrode 118. $V_g$ can be set such that it is at or above a threshold voltage (Vt) for the MSFET 110.1 The sense circuit 198 can be configured to detect and measure the drain current (Id). Since there is only one gate electrode, the MSFET 110.1 will be in either an on state with current flowing through the channel region or in an off state with no current flowing through the channel region. Since the gate electrode is located adjacent to one side (e.g., the first side) of the reservoir, the MSFET 110.1 will only be in the off state when the channel region 112 is angled above a specific degree relative to the top surface 119 of the conductive fluid 116 (e.g., due to chip tilt and/or acceleration) such that the level of the conductive fluid 116 on the first side drops to the point that the gate electrode 118 is no longer in contact with the conductive fluid 116. So, in this case, when the MSFET 110.1 is in the off state, the controller 190 (or 190') can characterize chip motion as either chip tilt to a threshold degree in one direction or chip acceleration to a threshold rate in one direction. When the MSFET 110.1 is in the on state, the controller 190 (or 190') can characterize chip motion as none detected. However, it should be understood that because there is only one gate electrode on one side of the reservoir some chip motion (e.g., tilt to a lesser degree and/or in a different direction; chip acceleration at a lesser rate and/or in a different direction) would be undetectable.

For the MSFET 110.2 shown in FIGS. 3A-3C-2 and described above, the bias circuit 199 could be electrically connected to the first and second gate electrodes 118a-118b and can be configured to apply first and second gate voltages ($V_{g1}$ and $V_{g2}$, respectively) to the first and second gate electrodes. $V_{g1}$ can be different from $V_{g2}$ (e.g., $V_{g1} < V_{g2}$) and both can be above the threshold voltage (Vt) of the MSFET 110.2. The sense circuit 198 can be configured to detect and measure the drain current (Id). In this case, the controller 190 (or 190') can characterize chip motion based on the value of Id as either no detected motion, chip motion in one direction, or chip motion in a different direction. Specifically, Id will be at its highest level when the chip 102 is upright, level and stationary such that both the first and second gate electrodes 118a-118b are in contact with the conductive fluid 116 and the sum of $V_{g1}$ and $V_{g2}$ are applied to the conductive fluid. Id will be at a middle level, when, due to tilt of the chip 102 upward on the first side (e.g., as shown in FIG. 3B-1) and/or acceleration of the chip 102 in a first direction from the second side toward the first side (e.g., as shown in FIG. 3C-1), the channel region 112 becomes angled to at least a specific first degree (e.g., to at least a some specific first angle ($\theta_1$)) relative to the top surface 119 of the conductive fluid 116 and the level of the conductive fluid 116 on the first side of the reservoir 114 drops so that the first gate electrode 118a becomes physically separated from the conductive fluid 116 (while the level of the conductive fluid 116 on the second side of the reservoir 114 is raised so that the second gate electrode 118b remains in contact with the conductive fluid 116). As a result, only $V_{g2}$ is applied to the conductive fluid. Id will be at a low level, when, due to tilt of the chip 102 upward on the second side (e.g., as shown in FIG. 3B-2) and/or acceleration of the chip 102 in a second direction from the first side toward the second side (e.g., as shown in FIG. 3C-2), the channel region 112 becomes angled to at least a specific second degree (e.g., to at least a some specific second angle ($\theta_2$)) relative to the top surface 119 of the conductive fluid 116 and the level of the conductive fluid 116 on the second side of the reservoir 114 drops so that the second gate electrode 118b becomes physically separated from the conductive fluid 116 (while the level of the conductive fluid 116 on the first side of the reservoir is raised so that the first gate electrode 118a remains in contact with the conductive fluid 116). As a result, only Vg1 is applied to the conductive fluid 116. So, in this case, the controller 190 (or 190') can, based on the drain current (Id), characterize chip motion as one of the following: no detected motion (e.g., when Id is at the highest level); chip tilt to a threshold degree in one direction or chip acceleration to a threshold rate in one direction (e.g., when Id is at the middle level); and chip tilt to a threshold degree in an opposite direction or chip acceleration to a threshold rate in an opposite direction (e.g., when Id is at the lowest level).

For the MSFET 110.3 shown in FIGS. 4A-4C-2 and described above or the MSFET 110.4 shown in FIGS. 5A-5C-2 and described above, the bias circuit 199 could be electrically connected to by a first bus to each of the first sub-electrodes (1-n) of the first gate electrode $118a_{1-n}$ and by a second bus to each of the second sub-electrodes (1-n) of the second gate electrode $118b_{1-n}$. The bias circuit 199 can further be configured to apply the same first gate voltage ($V_{g1}$) to each first sub-electrode and the same second gate voltage ($V_{g2}$) to each second sub-electrode. The sense circuit 198 can be configured to detect and measure the drain current (Id). In this case, the controller 190 (or 190') can characterize chip motion based on the value of Id as any of the following: no detected motion, chip motion to one of several possible levels in one direction, or chip motion to one of several possible levels in a different direction.

Specifically, in the MSFET 110.3, when, due to tilt of the chip 102 upward on the first side (e.g., as shown in FIG. 4B-1) and/or acceleration of the chip 102 in a first direction from the second side toward the first side (e.g., as shown in FIG. 4C-1), the channel region 112 becomes angled to progressively increasing first degrees (e.g., to progressively increasing first angles ($\theta_1$)) relative to the top surface 119 of the conductive fluid 116 and the level of the conductive fluid 116 on the first side of the reservoir 114 drops so that the first sub-electrodes of the first gate electrode $118a_{1-n}$ become physically separated from the conductive fluid 116 in order from the top down (i.e., 1 to n) (while the level of the conductive fluid 116 on the second side of the reservoir is raised so the second sub-electrodes of the second gate electrode $118b_{1-n}$ remain in contact with the conductive fluid 116). Furthermore, when, due to tilt of the chip 102 upward on the second side (e.g., as shown in FIG. 4B-2) and/or acceleration of the chip 102 in a second direction from the first side toward the second side (e.g., as shown in FIG. 4C-2), the channel region 112 becomes angled to progressively increasing second degrees (e.g., to progressively increasing second angles ($\theta_2$)) relative to the top surface 119 of the conductive fluid 116 and the level of the conductive fluid 116 on the second side of the reservoir 114 drops so that the second sub-electrodes of the second gate electrode $118b_{1-n}$ become physically separated from the conductive fluid 116 in order from top down (i.e., 1-n) (while the level of the conductive fluid 116 on the first side of the reservoir 114 is raised so that the first gate electrode $118a_{1-n}$ remains in contact with the conductive fluid 116).

Similarly, in the MSFET 110.4, when, due to tilt of the chip 102 upward on the first side (e.g., as shown in FIG. 5B-1) and/or acceleration of the chip 102 in a first direction from the second side toward the first side (e.g., as shown in FIG. 5C-1), the channel region 112 becomes angled to progressively increasing first degrees (e.g., to progressively increasing first angles ($\theta_1$)) relative to the top surface 119 of the conductive fluid 116 and the level of the conductive fluid 116 on the first side of the reservoir 114 drops so that the lower ones of the first sub-electrodes of the first gate electrode $118a_{1-n}$ become physically separated from the conductive fluid 116 in order from the top down (while the level of the conductive fluid 116 on the second side of the reservoir 114 is raised so that the upper ones of the second sub-electrodes of the second gate electrode $118b_{1-n}$ begin to contact the conductive fluid 116 in order from bottom up). Furthermore, when, due to tilt of the chip 102 upward on the second side (e.g., as shown in FIG. 5B-2) and/or acceleration of the chip 102 in a second direction from the first side toward the second side (e.g., as shown in FIG. 5C-2), the channel region 112 becomes angled to progressively increasing second degrees (e.g., to progressively increasing second angles ($\theta_2$)) relative to the top surface 119 of the conductive fluid 116 and the level of the conductive fluid 116 on the second side of the reservoir 114 drops so that the lower ones of the second sub-electrodes of the second gate electrode $118b_{1-n}$ become physically separated from the conductive fluid 116 in order from top down (i.e., 1-n) (while the level of the conductive fluid 116 on the first side of the reservoir 114 is raised so that the upper ones of the first sub-electrodes of the first gate electrode $118a_{1-n}$ begin to contact the conductive fluid 116 from bottom up).

Therefore, in either case, given the selection of $V_{g1}$ applied to each first sub-electrode and $V_{g2}$ applied to each second sub-electrode, the drain current (Id) will indicate how many of the first sub-electrodes and also how many of the second sub-electrodes remain in contact with the conductive fluid 116, thereby indicating the total effective gate voltage applied to the conductive fluid and, in turn, the orientation of (and, particularly, the actual angle of) the channel region 112 relative to the top surface of the conductive fluid 116. Since drain current (Id) is a function of the total effective gate voltage, then characterization of chip motion by the controller 190 based on the drain current (Id) can include not only the direction of chip tilt but also the degree of chip tilt or, alternatively, not only the direction of chip acceleration but also the rate of chip acceleration.

Figure 10:
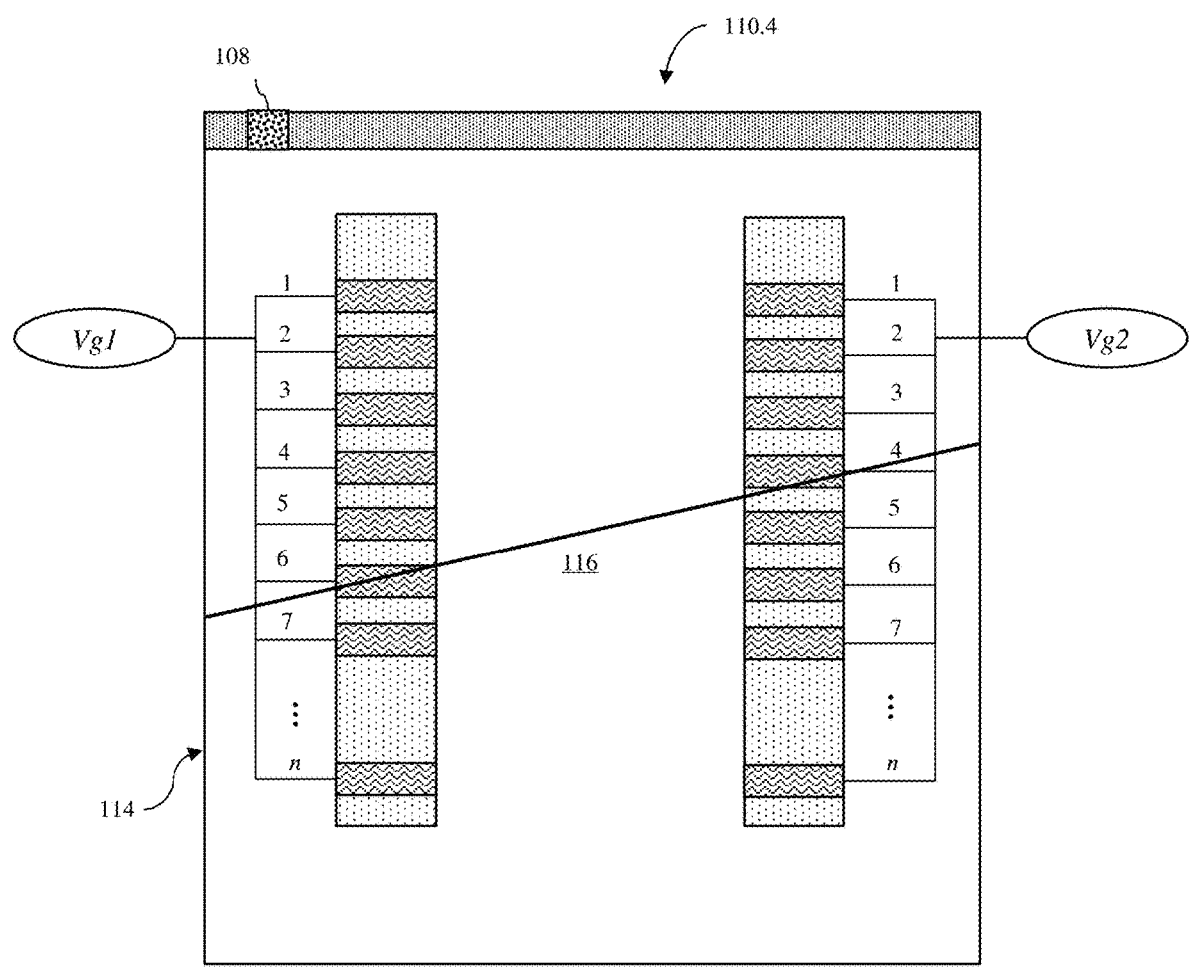
FIG. 10 is a cross-section diagram illustrating, in greater detail, the gate structure of the MSFET of FIGS. 5A-5C-2.

More specifically, consider a gate structure 113 of an MSFET 110.4 as shown in greater detail in FIG. 10. In this case, the total effective gate voltage applied to the conductive fluid 116 will change in response to chip motion (e.g., as the chip tilts or accelerates) because the number of first sub-electrodes of the first gate electrode $118a_{1-n}$ and the number of second sub-electrodes of the second gate electrode $118b_{1-n}$ that are in contact with the conductive fluid 116 will change. Specifically, the following equations apply:

$$V_1 = nV_{g1},$$

$$V_2 = nV_{g2},$$

$$V_1 + V_2 = V_T,$$

$$V_1 = fV_2,$$

$$V_1 = \frac{fV_T}{(f+1)},$$

$$V_2 = \frac{V_T}{(f+1)},$$

$$V_{g1} = \frac{fV_T}{n(f+1)},$$

$$V_{g2} = \frac{V_T}{n(f+1)},$$

$$n_2 = n - n_1$$

$$V_1' + V_2' = n_1 V_{g1} + (n - n_1)V_{g2} = V_T' = \left[\frac{n_1}{n}(f-1) + 1\right]\frac{V_T}{(f+1)}, \text{ and}$$

$$\Delta V_T^1 = \frac{(f-1)}{(f+1)}\frac{V_T}{n}(n_1 - n_1'),$$

where $V_1$ is the total possible voltage that could be applied through the first sub-electrodes of the first gate electrode 118a to the conductive fluid 116,
$V_{g1}$ is the first gate voltage applied to each first sub-electrode,
$V_2$ is the total possible voltage that could be applied through the second sub-electrodes of the second gate electrode 118b to the conductive fluid 116,
$V_{g2}$ is the second gate voltage applied to each second sub-electrode, $V_T$ is the total possible voltage that could be applied through the first sub-electrodes and the second sub-electrodes to the conductive fluid 116,
n is the total number of sub-electrodes in each gate electrode,
$n_1$ is the number of first sub-electrodes of the first gate electrode that are in contact with the conductive fluid 116 at any given time,
$n_2$ is the number of second sub-electrodes of the second gate electrode that are in contact with the conductive fluid 116 at any time, and
f is a factor that defines the relationship between $V_1$ and $V_2$.

The equations set out above can be employed to determine the optimal gate bias conditions and specifically to determine the optimal $V_{g1}$ to be applied to each first sub-electrode of the first gate electrode 118a of the gate structure 113 of the MSFET 110.4 and the optimal $V_{g2}$ to be applied to each second sub-electrode of the second gate electrode 118b of the gate structure 113 of the MSFET 110.4. The goal of these equations is to maximize the potential difference (i.e., the difference between $V_1$ and $V_2$) in order to improve chip motion detection sensitivity while also choosing a factor f that minimizes electrode-to-electrode leakage in the conductive fluid, which would reduce the overall effective voltage and the resulting drain current.

Figure 13:
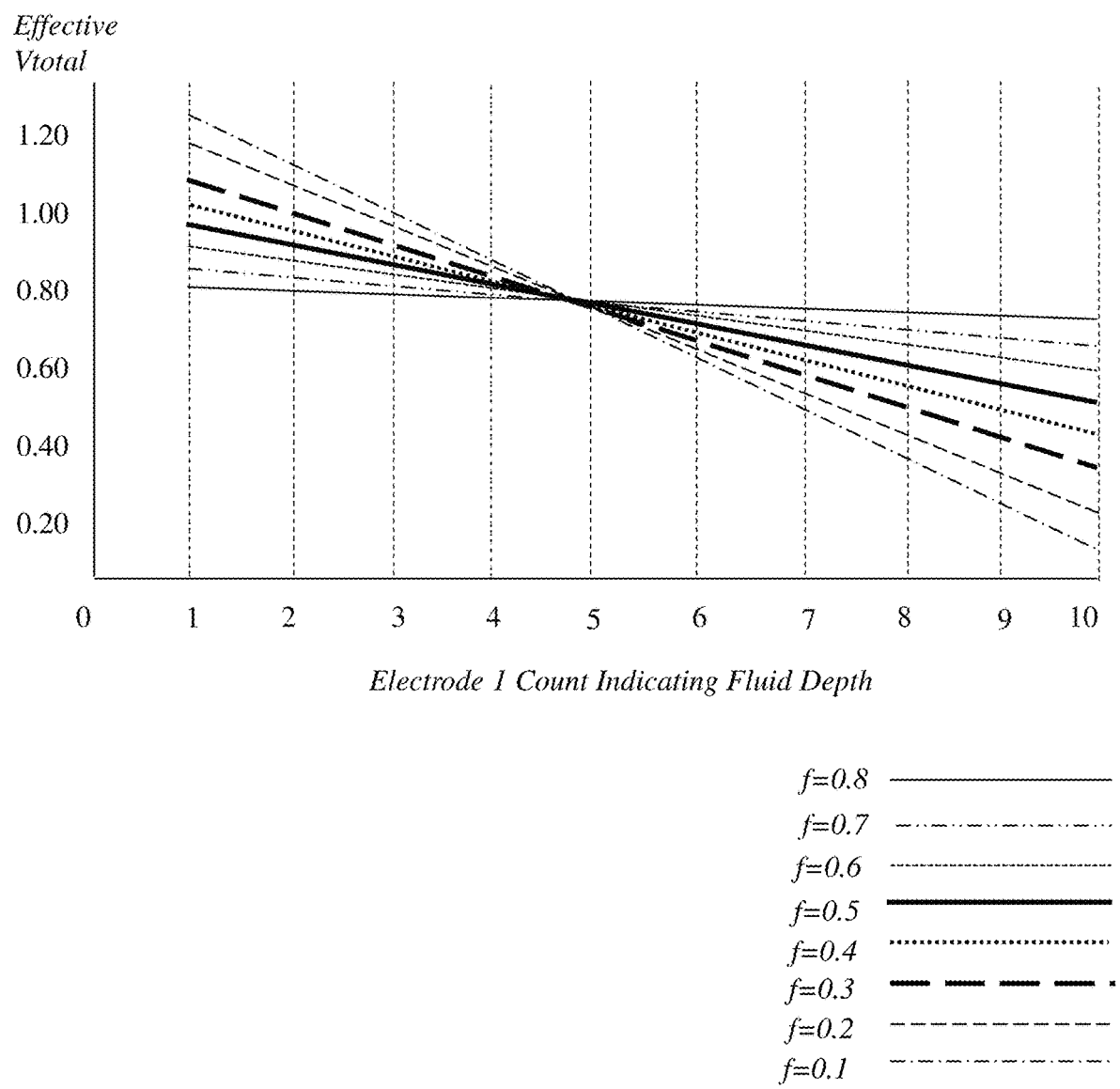
FIG. 13 is a graph illustrating a relationship between changes in electrolyte solution depth adjacent to a given gate electrode with 10 sub-electrodes and changes in the total effective voltage applied to the electrolyte solution as a function of different values of f.

Consider an exemplary MSFET 110.4 where the total possible gate voltage ($V_T$) is 1.5V and where n is 10 (i.e., where each gate electrode has 10 sub-electrodes). The table of FIG. 11 illustrates possible $V_1$ and $V_2$ values as a function of different factors 5 that can be employed in order to achieve $V_T$ of 1.5V. As illustrated in FIG. 11, if f=1, then $V_1$ and $V_2$ will be equal, whereas, if f=0.1, $V_1$ and $V_2$ will have the greatest possible difference. The table of FIG. 12 illustrates, how (given that $n_1$ is the number of first sub-electrodes in contact with the conductive fluid 116 at any given time and $n_2$ is the number of second sub-electrodes in contact with the conductive fluid 116 at any given time and equals n−$n_1$) changes in the level of the conductive fluid 116 adjacent to the first gate electrode 118a and concurrent changes in the level of conductive fluid 116 adjacent to the second gate electrode 118b (e.g., due to chip tilt and/or chip acceleration) result in changes in the total effective gate voltage applied to the conductive fluid for different values of f. If f=1 (i.e., if the same voltage is applied to each sub-electrode in each of the gate electrodes), then the total effective gate voltage applied to the conductive fluid will always be 0.75V. In this case, the drain current (Id) will remain unchanged with chip movement and no information regarding chip motion is learned. However, if f<1, there will be an asymmetric split between $V_1$ and $V_2$. The total effective gate voltage applied to the conductive fluid 116 of the gate structure 113 of a MSFET 110.4 will vary as a function of chip motion (e.g., due to chip tilt to different degrees in different directions and/or chip acceleration to different rates in different directions) because of the resulting orientation of the channel region relative to the top surface of the conductive fluid. Consequently, the drain current (Id) will also change with chip movement and can be employed by the controller 190 (or 190') to characterize chip movement with a significant sensitivity. FIG. 13 is a plot further illustrating the relationship between changes in the depth of the electrolyte solution adjacent to a given gate electrode with n sub-electrodes (e.g., 10 sub-electrodes) and changes in the total effective voltage applied to the electrolyte solution as a function of different values of f.

Those skilled in the art will recognize that on-chip bias circuits, which are configured to apply different bias voltages to different on-chip components, and on-chip sense circuits, which are configured to sense electrical properties (e.g., drain current (Id)) of FETs, are well known in the art. Thus, the details of such bias and sense circuits have been omitted from the specification in order to allow the reader to focus on the salient aspects of the disclosed embodiments.

Figure 14:
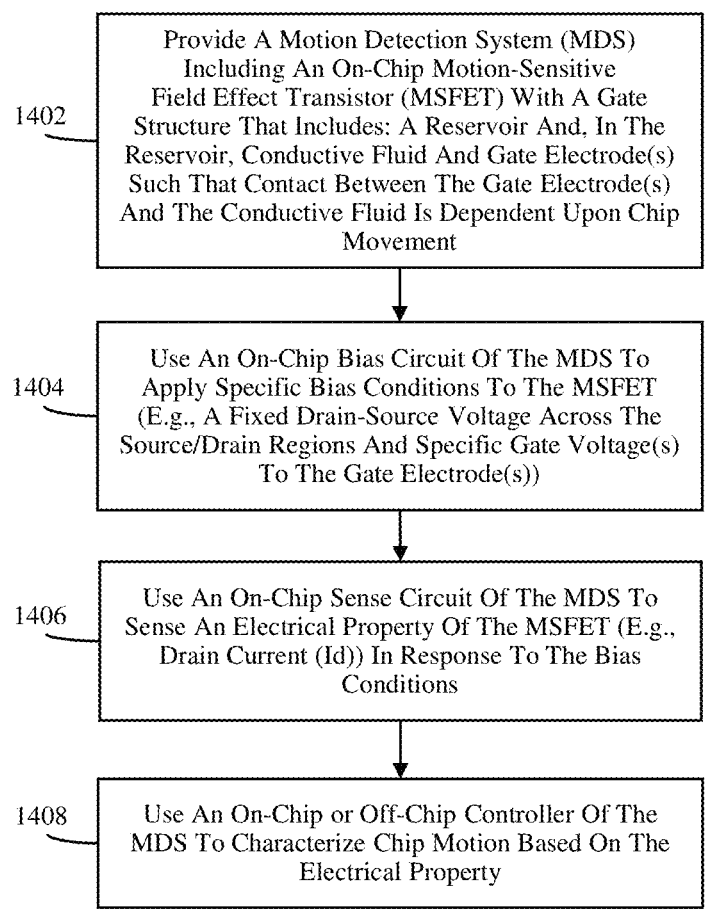
FIG. 14 is a flow diagram illustrating embodiments of a motion detection method.

FIG. 14 is a flow diagram illustrating embodiments of a motion detection method.

The method can include providing a motion detection system (MDS), such as the MDS 100 described in detail above and illustrated in FIG. 1 (see process step 1402). That is, the MDS 100 can include a chip 102 and, on the chip 102, a motion-sensitive field effect transistor (MSFET), a bias circuit 199 electrically connected to the MSFET, and a sense circuit 198 electrically connected to the MSFET. The MDS 100 can further include a controller, which is either on the chip 102 (e.g., see the controller 190) or off but in communication with the chip 102 (e.g., see the controller 190').

It should be noted that the MSFET could be any of the above-described MSFET embodiments including, but not limited to: the MSFET 110.1 illustrated in FIGS. 2A-2C; the MSFET 110.2 illustrated in FIGS. 3A to 3C-2; the MSFET 110.3 illustrated in FIGS. 4A to 4C-2; or the MSFET 110.4 illustrated in FIGS. 5A to 5C-2. Each such MSFETs 110.1-110.4 includes: source/drain regions 111; a channel region 112 positioned laterally between source/drain regions 111; and a gate structure 113 adjacent to the channel region 112. The gate structure includes: a reservoir 114 with a bottom adjacent to the channel region 112; conductive fluid 116 contained within the reservoir 114 and, particularly, only partially filling the reservoir 114; and at least one gate electrode (e.g., see the gate electrode 118 of the gate structure 113 in the MSFET 110.1; see the gate electrodes 118a-118b of the gate structure 113 of the MSFET 110.2, and see the gate electrodes $118a_{1-n}$ and $118b_{1-n}$ of the MSFETs 110.3 and 110.4) at a fixed location within the interior of the reservoir 114. Given the fixed location of each gate electrode within the reservoir and the fill level of the conductive fluid within the reservoir, contact between the gate electrode(s) (or, if applicable, sub-electrodes thereof) and the conductive fluid depends upon the orientation the channel region 112 relative to the top surface 119 of the conductive fluid 116 and the orientation of the channel region 112 relative to the top surface 119 of the conductive fluid 116 depends upon position in space and/or movement of the MSFET and, more particularly, upon position in space and/or movement (e.g., tilt and/or acceleration) of the chip 102 on which the MSFET is formed.

With such a MSFET structure, an electrical property will vary as a function of the total effective gate voltage applied to the conductive fluid and the total effective gate voltage applied to the conductive fluid will vary as a function of which gate electrode(s) (or, if applicable, which sub-electrodes thereof) is/are in contact with the conductive fluid. Since contact between the conductive fluid and the gate electrode(s) (or sub-electrodes thereof) is motion-dependent, chip motion can be characterized by measuring the electric property of the MSFET in response to specific bias conditions.

Therefore, the method further includes using the bias circuit 199 to apply specific bias conditions to the MSFET (see process step 1404) and using the sense circuit 198 to sense (e.g., to detect and measure) an electrical property of the MSFET in response to the specific bias conditions (see process step 1406). Various different modes of operations could be employed for using the MSFET as a motion sensor. That is, different electrical properties could be sensed in response to different bias conditions. However, in exemplary method embodiments, the specific bias conditions used at process step 1404 can include, for example, a fixed drain-source voltage (Vds) between the source/drain regions 111 and also specific gate voltage(s) to each gate electrode (or, if applicable, to each sub-electrode thereof). It should be noted that the optimal bias conditions and, particularly, optimal gate voltages are discussed in greater detail above with regard to the various MSFET structure embodiments and FIGS. 10-13. In this case, the electrical property sensed at process step 1406 in response to the specific bias conditions can be drain current (Id).

Finally, the method can further include using the controller 190 (or 190') to characterize chip motion (e.g., chip tilt and/or acceleration) based on the measured value of the electrical property (e.g., the measured drain current (Id)

value) (see process step 1408). In the exemplary embodiments, drain current (Id) will vary as a function of the total effective gate voltage applied to the conductive fluid and the total effective gate voltage applied to the conductive fluid will vary as a function of which gate electrode(s) (or, if applicable, which sub-electrodes thereof) is/are in contact with the conductive fluid. Since contact between the conductive fluid and the gate electrode(s) (or sub-electrodes thereof) is motion-dependent, chip motion can be characterized by the controller based on the drain current (Id).

For purposes of illustration, the cap layer 107 is shown in the figures as being essentially planar and extending across the reservoir 114 without dipping into the reservoir 114. Those skilled in the art will recognize that the orientation of the cap layer 107 relative to the reservoir 114 may vary depending upon the processing techniques, materials used and/or the dimensions of the reservoir 114 and thickness of the deposited cap layer 107.

Figure 15A:
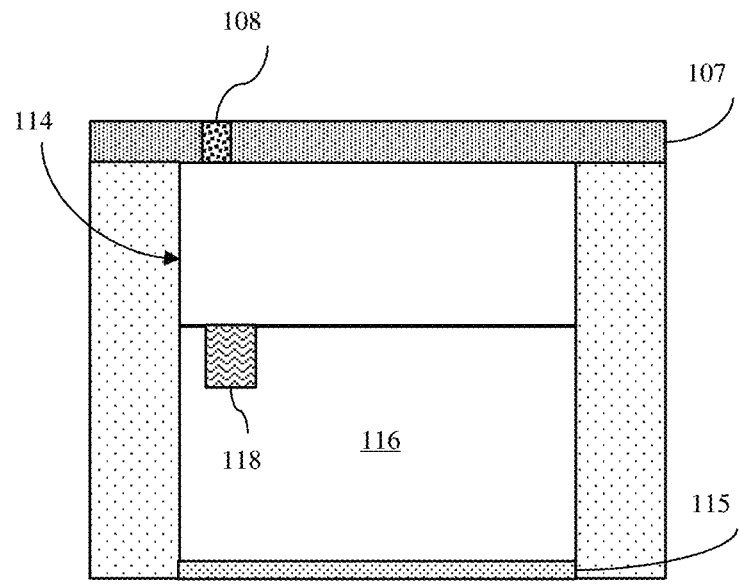
FIGS. 15A and 15B are cross-section diagrams illustrating alternative cap layer shapes.

For example, in some embodiments, the processing techniques can include forming the reservoir 114 (e.g., a trench) in the ILD layer 106 and also forming electrode(s) in and/or adjoining the reservoir 114 (as discussed above), filling the remaining space within the reservoir 114 with a sacrificial fill material, and removing the sacrificial fill material from above the ILD layer 106 (e.g., by performing a chemical mechanical polishing (CMP) process). Then, the cap layer 107 can be formed (e.g., deposited) over the co-planar top surfaces of the ILD layer 106 and the sacrificial fill material within the reservoir 114 such that it is an essentially planar cap layer 107. Subsequently, a port 108 (e.g., an opening) can be formed through the cap layer 107 to expose the sacrificial fill material, the sacrificial fill material can be selectively removed from the reservoir 114 through the port 108, the conductive fluid 116 can be added to the reservoir 114 through the port 108, and the port 108 can be plugged. It should be noted that the materials for the ILD layer 106, the cap layer 107, the electrode(s), and the sacrificial fill material should be selected so that the sacrificial fill material can be selectively removed from the reservoir 114 through the port 108 without damaging other exposed surfaces. For example, the ILD layer 106 and cap layer 107 could be silicon dioxide and the sacrificial fill material could be either: (a) a silicon fill material (e.g., polysilicon), which is removable following port formation through XeF2 vapor etching or SF6 plasma etching; or (b) a polymer fill material, which is removable following port formation through oxygen plasma etching. Such processing would thus result in the cap layer 107 being essentially planar, as shown in FIG. 15A (and in the other figures described above).

Figure 15B:
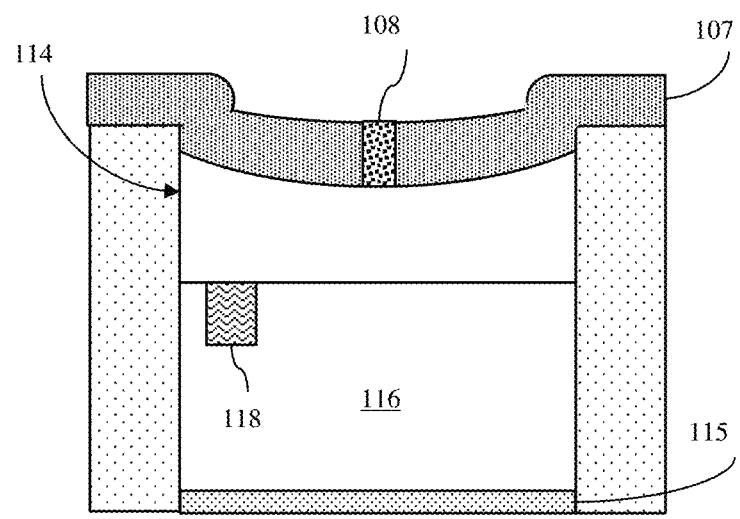

In other embodiments, the processing techniques can include forming the reservoir 114 (e.g., a trench) in the ILD layer 106 and also forming electrode(s) in and/or adjoining the reservoir 114 (as discussed above). The cap layer 107 can then be formed on the top surface of the ILD layer 106 over the trench, thereby forming an air-fill compartment. State of the art capping techniques (e.g., borrowed from chip packaging) could be employed to form this cap layer. Depending upon the size of the trench opening at the top surface of the ILD layer and also depending upon the thickness of the deposited layer, such processing could result in the cap layer 107 dipping into the reservoir 114 and closing or pinching off at the top of the reservoir, as shown in FIG. 15B. Optionally, the trench can be partially filled with the conductive fluid 116 prior to cap layer formation. Alternatively, following cap layer formation, the port 108 can be formed in the cap layer 107, the conductive fluid 116 can be added to the reservoir 114 and the port 108 can be plugged.

It should be understood that the figures and processing techniques discussed above are not intended to be limiting. The reservoir 114 and cap layer 107, which caps the reservoir 114, can be formed using any technique that is suitable for ensuring that, when the reservoir 114 is partially filled with the conductive fluid 116 and capped by a cap layer 107, leakage or loss of the conductive fluid 116 is prevented and an air or gas-filled space remains within the reservoir 114, thereby allowing the conductive fluid to move and movement to be detected, as described above.

It should be understood that in the structures and methods described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

Also disclosed herein are embodiments of a computer program product for implementing one or more features of the above-described motion detection systems and methods. Specifically, the computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
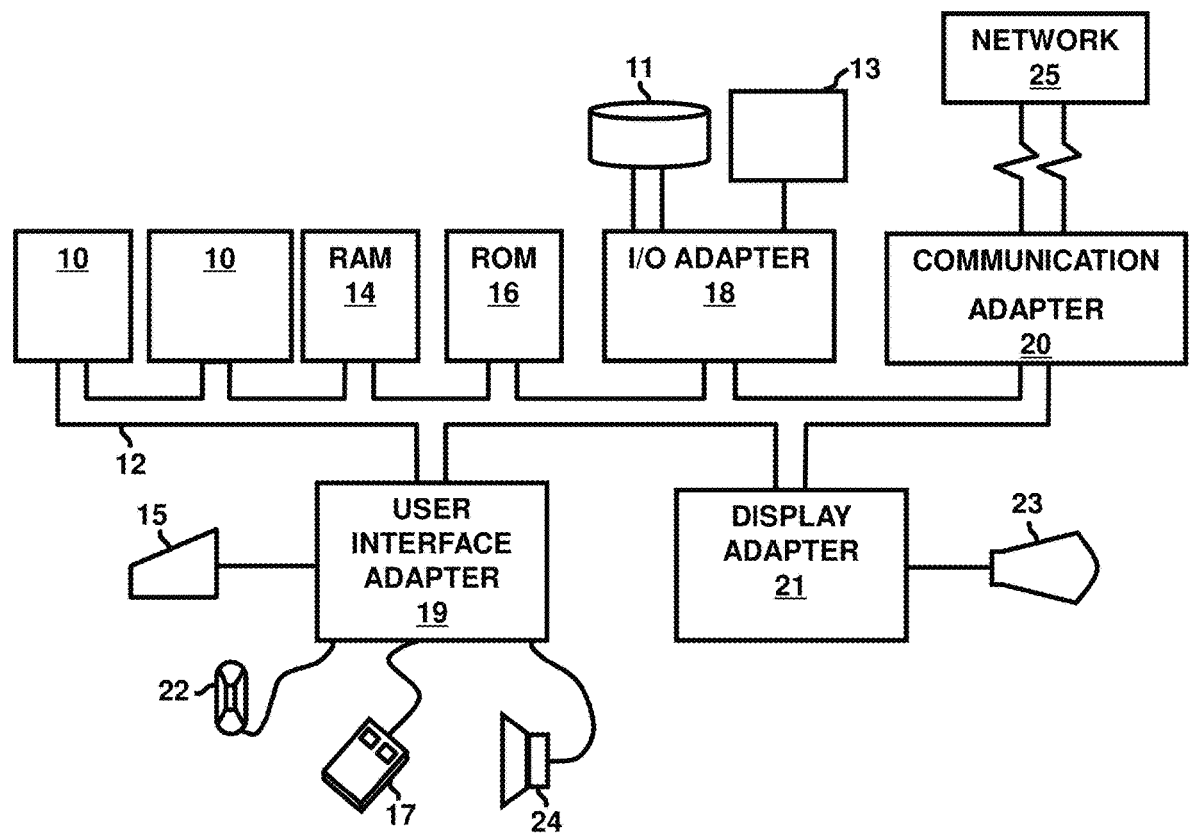
FIG. 16 is a schematic diagram illustrating a representative computer system for implementing one or more features of the disclosed motion detection system and method.

FIG. 16 is a schematic diagram illustrating a representative computer system for implementing one or more features of disclosed motion detection system and method. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A transistor comprising:
    a channel region; and
    a gate structure adjacent to the channel region and comprising:
        a reservoir configured to contain a conductive fluid; and
        at least one gate electrode at a fixed location within the reservoir, wherein an orientation of the channel region relative to a top surface of the conductive fluid depends on movement of the transistor and wherein contact between the at least one gate electrode and the conductive fluid depends upon the orientation of the channel region relative to the top surface of the conductive fluid.

2. The transistor of claim 1,
wherein the gate structure comprises a single gate electrode, and
wherein the fixed location of the single gate electrode within the reservoir and a fill level of the conductive fluid within the reservoir are such that:
    when the channel region and the top surface of the conductive fluid are parallel the single gate electrode is in contact with the conductive fluid, and
    when the channel region is angled to at least some specific degree relative to the top surface of the conductive fluid, the single gate electrode becomes physically separated from the conductive fluid.

3. The transistor of claim 1,
wherein the gate structure comprises: a first gate electrode adjacent to a first side of the reservoir; and a second gate electrode adjacent to a second side of the reservoir, and
wherein fixed locations of the first gate electrode and the second gate electrode within the reservoir and a fill level of the conductive fluid within the reservoir are such that:
    when the channel region and the top surface of the conductive fluid are parallel, the first gate electrode and the second gate electrode are in contact with the conductive fluid,
    when the channel region is angled to a first degree relative to the top surface of the conductive fluid, the first gate electrode becomes physically separated from the conductive fluid and the second gate electrode remains in contact with the conductive fluid, and
    when the channel region is angled to a second degree relative to the top surface of the conductive fluid, the second gate electrode becomes physically separated from the conductive fluid and the first gate electrode remains in contact with the conductive fluid.

4. The transistor of claim 1,
wherein the gate structure comprises: a first gate electrode comprising a stack of electrically isolated first sub-electrodes adjacent to first side of the reservoir; and a second gate electrode comprising a stack of electrically isolated second sub-electrodes adjacent to a second side of the reservoir, and
wherein fixed locations of the first gate electrode and the second gate electrode within the reservoir and a fill level of the conductive fluid within the reservoir are such that:
    when the channel region and the top surface of the conductive fluid are parallel, all of the first sub-electrodes and all of the second sub-electrodes are all in contact with the conductive fluid,
    when the channel region is angled to progressively increasing first degrees relative to the top surface of the conductive fluid, the first sub-electrodes become physically separated from the conductive fluid in order from top down and the second sub-electrodes remain in contact with the conductive fluid, and
    when the channel region is angled to progressively increasing second degrees relative to the top surface of the conductive fluid, the second sub-electrodes become physically separated from the conductive fluid in order from top down and the first sub-electrodes remain in contact with the conductive fluid.

5. The transistor of claim 1,
wherein the gate structure comprises: a first gate electrode comprising a stack of electrically isolated first sub-electrodes adjacent to first side of the reservoir; and a second gate electrode comprising a stack of electrically isolated second sub-electrodes adjacent to a second side of the reservoir, and
wherein fixed locations of the first gate electrode and the second gate electrode within the reservoir and a fill level the conductive fluid within the reservoir are such that:
when the channel region and the top surface of the conductive fluid are parallel, lower ones of the first sub-electrodes and lower ones of the second sub-electrodes are in contact with the conductive fluid and upper ones of the first sub-electrodes and upper ones of the second sub-electrodes are physically separated from the conductive fluid,
when the channel region is angled to progressively increasing first degrees relative to the top surface of the conductive fluid, the lower ones of the first sub-electrodes become physically separated from the conductive fluid in order from top down and the upper ones of the second sub-electrodes contact the conductive fluid in order from bottom up, and
when the channel region is angled to progressively increasing second degrees relative to the top surface of the conductive fluid, the lower ones of the second sub-electrodes become physically separated from the conductive fluid in order from top down and the upper ones of the first sub-electrodes contact the conductive fluid in order from bottom up.

6. The transistor of claim 1, wherein the gate structure comprises more than two gate electrodes at fixed locations within the reservoir.

7. The transistor of claim 1, wherein the reservoir is capped to prevent leakage of the conductive fluid.

8. A system comprising:
a transistor on a chip, wherein the transistor comprises:
a channel region; and
a gate structure adjacent to the channel region and comprising:
a reservoir configured to contain a conductive fluid; and
at least one gate electrode at a fixed location within the reservoir, wherein an orientation of the channel region relative to a top surface of the conductive fluid depends on movement of the transistor and wherein contact between the at least one gate electrode and the conductive fluid depends upon the orientation of the channel region relative to the top surface of the conductive fluid;
a bias circuit electrically connected to the transistor, wherein the bias circuit is configured to apply specific bias conditions to the transistor; and
a sense circuit electrically connected to the transistor, wherein the sense circuit is configured to sense at least one electrical property of the transistor in response to the specific bias conditions.

9. The system of claim 8,
wherein the gate structure comprises a single gate electrode,
wherein the fixed location of the single gate electrode within the reservoir and a fill level of the conductive fluid within the reservoir are such that:
when the channel region and the top surface of conductive fluid are parallel, the single gate electrode is in contact with the conductive fluid, and
when the channel region is angled to at least a specific degree relative to the top surface of the conductive fluid, the single gate electrode becomes physically separated from the conductive fluid,
wherein the specific bias conditions comprise a fixed drain-source voltage and a fixed gate voltage,
wherein the electrical property is drain current,
wherein the drain current indicates whether the transistor is in an OFF state, and
wherein the OFF state indicates any of the chip is tilted and the chip is accelerating.

10. The system of claim 8,
wherein the gate structure comprises: a first gate electrode adjacent to a first side of the reservoir; and a second gate electrode adjacent to a second side of the reservoir,
wherein fixed locations of the first gate electrode and the second gate electrode within the reservoir and a fill level of the conductive fluid within the reservoir are such that:
when the channel region and the top surface of the conductive fluid are parallel, the first gate electrode and the second gate electrode are in contact with the conductive fluid,
when the channel region is angled to at least a first degree relative to the top surface of the conductive fluid, the first gate electrode becomes physically separated from the conductive fluid and the second gate electrode remains in contact with the conductive fluid, and
when the channel region is angled to at least a second degree relative to the top surface of the conductive fluid, the second gate electrode becomes physically separated from the conductive fluid and the first gate electrode remains in contact with the conductive fluid,
wherein the specific bias conditions comprise a fixed drain-source voltage, a fixed first gate voltage on the first gate electrode, and a fixed second gate voltage on the second gate electrode,
wherein the fixed first gate voltage is less than the fixed second gate electrode,
wherein the electrical property is drain current, and
wherein the drain current is indicative of any of (a) chip tilt direction and angle and (b) chip acceleration direction and rate.

11. The system of claim 8,
wherein the gate structure comprises: a first gate electrode comprising a stack of electrically isolated first sub-electrodes adjacent to a first side of the reservoir; and a second gate electrode comprising a stack of electrically isolated second sub-electrodes adjacent to a second side of the reservoir,
wherein fixed locations of the first gate electrode and the second gate electrode within the reservoir and a fill level of the conductive fluid within the reservoir are such that:
when the channel region and the top surface of the conductive fluid are parallel, all of the first sub-electrodes and all of the second sub-electrodes are all in contact with the conductive fluid,
when the channel region is angled to progressively increasing first degrees relative to the top surface of the conductive fluid, the first sub-electrodes become physically separated from the conductive fluid in order from top down and the second sub-electrodes remain in contact with the conductive fluid, and when the channel region is angled to progressively increasing second degrees relative to the top surface of the conductive fluid, the second sub-electrodes become physically separated from the conductive fluid in order from top down and the first sub-electrodes remain in contact with the conductive fluid, wherein the specific bias conditions comprise a fixed drain-source voltage, a fixed first gate voltage on each of the first sub-electrodes, and a fixed second gate voltage on each of the second sub-electrodes, wherein the fixed first gate voltage is less than the fixed second gate electrode, wherein the electrical property is drain current, and wherein the drain current is indicative of any of (a) chip tilt direction and angle and (b) chip acceleration direction and rate.

12. The system of claim 8, wherein the gate structure comprises: a first gate electrode comprising a stack of electrically isolated first sub-electrodes adjacent to a first side of the reservoir; and a second gate electrode comprising a stack of electrically isolated second sub-electrodes adjacent to a second side of the reservoir, wherein fixed locations of the first gate electrode and the second gate electrode within the reservoir and a fill level of the conductive fluid within the reservoir are such that:

when the channel region and the top surface of the conductive fluid are parallel, lower ones of the first sub-electrodes and lower ones of the second sub-electrodes are in contact with the conductive fluid and upper ones of the first sub-electrodes and upper ones of the second sub-electrodes are physically separated from the conductive fluid, when the channel region is angled to progressively increasing first degrees relative to the top surface of the conductive fluid, the lower ones of the first sub-electrodes become physically separated from the conductive fluid in order from top down and the upper ones of the second sub-electrodes contact the conductive fluid in order from bottom up, and when the channel region is angled to progressively increasing second degrees relative to the top surface of the conductive fluid, the lower ones of the second sub-electrodes become physically separated from the conductive fluid in order from top down and the upper ones of the first sub-electrodes contact the conductive fluid in order from bottom up, wherein the specific bias conditions comprise a fixed drain-source voltage, a fixed first gate voltage on each of the first sub-electrodes, and a fixed second gate voltage on each of the second sub-electrodes, wherein the fixed first gate voltage is less than the fixed second gate electrode, and wherein the electrical property is drain current, and wherein the drain current is indicative of any of (a) chip tilt direction and angle and (b) chip acceleration direction and rate.

13. The system of claim 8, wherein the gate structure comprises more than two gate electrodes at fixed locations within the reservoir.

14. The system of claim 8, wherein the reservoir is capped to prevent leakage of the conductive fluid.

15. A method comprising:

applying, by a bias circuit, specific bias conditions to a transistor on a chip, wherein the transistor comprises:

a channel region; and a gate structure adjacent to the channel region and comprising:

a reservoir configured to contain a conductive fluid; and at least one gate electrode at a fixed location within the reservoir, wherein an orientation of the channel region relative to a top surface of the conductive fluid depends on movement of the chip and wherein contact between the at least one gate electrode and the conductive fluid depends upon the orientation of the channel region relative to the top surface of the conductive fluid; and sensing, by a sense circuit, at least one electrical property of the transistor in response to the specific bias conditions.

16. The method of claim 15, wherein the gate structure comprises a single gate electrode, wherein the fixed location of the single gate electrode and a fill level of the conductive fluid within the reservoir are such that:

when the channel region and the top surface of the conductive fluid are parallel, the single gate electrode is in contact with the conductive fluid, and when the channel region is angled to at least a specific degree relative to the top surface of the conductive fluid, the single gate electrode becomes physically separated from the conductive fluid, wherein the specific bias conditions comprise a fixed drain-source voltage and a fixed gate voltage, wherein the electrical property is drain current, wherein the method further comprises, based on the drain current, determining whether the transistor is in an OFF state, and wherein the OFF state indicates that the chip is any of tilted and accelerating.

17. The method of claim 15, wherein the gate structure comprises: a first gate electrode adjacent to a first side of the reservoir; and a second gate electrode adjacent to a second side of the reservoir, wherein fixed locations of the first gate electrode and the second gate electrode within the reservoir and a fill level of the conductive fluid within the reservoir are such that:

when the channel region and the top surface of the conductive fluid are parallel, the first gate electrode and the second gate electrode are in contact with the conductive fluid, when the channel region is angled to at least a first degree relative to the top surface of the conductive fluid, the first gate electrode becomes physically separated from the conductive fluid and the second gate electrode remains in contact with the conductive fluid, and when the channel region is angled to at least a second degree relative to the top surface of the conductive fluid, the second gate electrode becomes physically separated from the conductive fluid and the first gate electrode remains in contact with the conductive fluid, wherein the specific bias conditions comprise a fixed drain-source voltage, a fixed first gate voltage on the first gate electrode, and a fixed second gate voltage on the second gate electrode, wherein the fixed first gate voltage is less than the fixed second gate electrode, wherein the electrical property is drain current, and
wherein the method further comprises, based on the drain current, estimating any of (a) a chip tilt direction and angle and (b) a chip acceleration direction and rate.

18. The method of claim 15,
wherein the gate structure comprises: a first gate electrode comprising a stack of electrically isolated first sub-electrodes adjacent to a first side of the reservoir; and a second gate electrode comprising a stack of electrically isolated second sub-electrodes adjacent to a second side of the reservoir,
wherein fixed locations of the first gate electrode and the second gate electrode within the reservoir and a fill level of the conductive fluid within the reservoir are such that:
  when the channel region and the top surface of the conductive fluid are parallel, all of the first sub-electrodes and all of the second sub-electrodes are all in contact with the conductive fluid,
  when the channel region is angled to progressively increasing first degrees relative to the top surface of the conductive fluid, the first sub-electrodes become physically separated from the conductive fluid in order from top down and the second sub-electrodes remain in contact with the conductive fluid, and
  when the channel region is angled to progressively increasing second degrees relative to the top surface of the conductive fluid, the second sub-electrodes become physically separated from the conductive fluid in order from top down and the first sub-electrodes remain in contact with the conductive fluid,
wherein the specific bias conditions comprise a fixed drain-source voltage, a fixed first gate voltage on each of the first sub-electrodes, and a fixed second gate voltage on each of the second sub-electrodes,
wherein the fixed first gate voltage is less than the fixed second gate electrode,
wherein the electrical property is drain current, and
wherein the method further comprises, based on the drain current, estimating any of (a) a chip tilt direction and angle and (b) a chip acceleration direction and rate.

19. The method of claim 15,
wherein the gate structure comprises: a first gate electrode comprising a stack of electrically isolated first sub-electrodes adjacent to a first side of the reservoir; and a second gate electrode comprising a stack of electrically isolated second sub-electrodes adjacent to a second side of the reservoir,
wherein fixed locations of the first gate electrode and the second gate electrode within the reservoir and a fill level of the conductive fluid within the reservoir are such that:
  when the channel region and the top surface of the conductive fluid are parallel, lower ones of the first sub-electrodes and lower ones of the second sub-electrodes are in contact with the conductive fluid and upper ones of the first sub-electrodes and upper ones of the second sub-electrodes are physically separated from the conductive fluid,
  when the channel region is angled to progressively increasing first degrees relative to the top surface of the conductive fluid, the lower ones of the first sub-electrodes become physically separated from the conductive fluid in order from top down and the upper ones of the second sub-electrodes contact the conductive fluid in order from bottom up, and
  when the channel region is angled to progressively increasing second degrees relative to the top surface of the conductive fluid, the lower ones of the second sub-electrodes become physically separated from the conductive fluid in order from top down and the upper ones of the first sub-electrodes contact the conductive fluid in order from bottom up,
wherein the specific bias conditions comprise a fixed drain-source voltage, a fixed first gate voltage on each of the first sub-electrodes, and a fixed second gate voltage on each of the second sub-electrodes,
wherein the fixed first gate voltage is less than the fixed second gate electrode, and
wherein the electrical property is drain current, and
wherein the method further comprises, based on the drain current, estimating any of (a) a chip tilt direction and angle and (b) a chip acceleration direction and rate.

20. The method of claim 15,
wherein the gate structure comprises more than two gate electrodes at fixed locations within the reservoir, and
wherein the reservoir is capped to prevent leakage of the conductive fluid.

\* \* \* \* \*